United States Patent
Nozue et al.

(10) Patent No.: US 8,436,101 B2
(45) Date of Patent: *May 7, 2013

(54) ETHYLENE-α-OLEFIN COPOLYMER AND MOLDED OBJECT THEREOF

(75) Inventors: Yoshinobu Nozue, Ichihara (JP); Yasutoyo Kawashima, Pasadena, CA (US); Naoko Ochi, Chiba (JP); Takuya Ogane, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/128,554

(22) PCT Filed: Nov. 10, 2009

(86) PCT No.: PCT/JP2009/069418
§ 371 (c)(1),
(2), (4) Date: May 10, 2011

(87) PCT Pub. No.: WO2010/055935
PCT Pub. Date: May 20, 2010

(65) Prior Publication Data
US 2011/0218308 A1 Sep. 8, 2011

(30) Foreign Application Priority Data
Nov. 11, 2008 (JP) .................. 2008-288496

(51) Int. Cl.
*C08L 23/04* (2006.01)
*C08F 4/646* (2006.01)
*C08F 4/6592* (2006.01)
*C08F 10/02* (2006.01)

(52) U.S. Cl.
USPC .......... 525/240; 526/113; 526/114; 526/160; 526/348; 526/943

(58) Field of Classification Search .............. 526/113, 526/114, 160, 348, 943; 525/240
See application file for complete search history.

(56) References Cited

U.S. PATENT DOCUMENTS

| | | | |
|---|---|---|---|
| 5,874,513 A | 2/1999 | Watanabe et al. | |
| 6,162,871 A | 12/2000 | Watanabe et al. | |
| 6,423,808 B1 | 7/2002 | Watanabe et al. | |
| 6,492,475 B1 | 12/2002 | Egashira et al. | |
| 2010/0305292 A1* | 12/2010 | Nozue et al. | 526/348.5 |
| 2010/0310799 A1* | 12/2010 | Nozue et al. | 428/35.7 |

FOREIGN PATENT DOCUMENTS

| | | |
|---|---|---|
| CN | 1135490 A | 11/1996 |
| CN | 1305502 A | 7/2001 |
| JP | 04-213309 A | 4/1992 |
| JP | 5-202124 A | 8/1993 |
| JP | 2000-229990 A | 8/2000 |
| JP | 2005-97481 A | 4/2005 |
| JP | 2006-002098 A | 1/2006 |
| JP | 2007-177183 A | 7/2007 |
| JP | 2008-088443 A | 4/2008 |
| WO | WO9937654 A1 | 7/1999 |
| WO | WO9945014 A1 | 9/1999 |

OTHER PUBLICATIONS

International Search Report corresponding with International Application No. PCT/JP2009/069418 dated Feb. 16, 2010, 2 pages (in English).
Katrin Schmidt et al., "Photochemical Isomerization of Me2Si-Bridged Zirconocene Complexes. Application to Stereoselective Syntheses of ansa-Zirconocene Binaphtholate Stereoisomers", Organometallics, vol. 16, No. 8, 1997, pp. 1724-1728.
Gema Martinez et al., "Synthesis and characterization of methyl-phenyl-substituted cyclopentadienyl zirconium complexes", Journal of Organometallic Chemistry, 690 (4), 2005, pp. 952-961.
Kai Hortmann et al., "Steric effects in ansa-metallocene-based Ziegler-Natta catalysts: coordination gap aperture and obliquity angles as parameters for structure-reactivity correlations", New Journal of Chemistry, vol. 16, (1-2), 1992, pp. 51-55.
Santiago Gomez-Ruiz et al., "Synthesis, characterization and catalytic behaviour of ansa-zirconocene complexes containing tetraphenylcyclopentadienyl rings: X-ray crystal structures of [Zr{Me2Si(n5-C5Ph4)(n 5-C5H3R)} C12] (R=H, But)", Journal of Organometallic Chemistry, vol. 693 (4), 2008, pp. 601-610.
Chinese Office Action dated Jun. 29, 2012, issued against CN Patent Application No. 200980144957.0.
Japanese Office Action (with translation) dated Mar. 12, 2013, issued against JP Patent Application No. 2009-256850.

* cited by examiner

*Primary Examiner* — Caixia Lu
(74) *Attorney, Agent, or Firm* — Fitch, Even, Tabin & Flannery, LLP

(57) ABSTRACT

The purpose of the invention is to provide an ethylene-α-olefin copolymer, which has a high melt tension but a small neck-in, and a molded object produced by extrusion molding of the copolymer. An ethylene-α-olefin copolymer having a monomer unit based on ethylene and a monomer unit based on an α-olefin having 3 to 20 carbon atoms, which has a melt flow rate (MFR) of 0.1 to 100 g/10 min, a density (d) of 850 to 940 kg/m³, a ratio (Mw/Mn) of weight average molecular weight (Mw) to number average molecular weight (Mn) of 2 to 12, and a value g* defined by the following formula (I) of 0.50 to 0.75:

$$g^* = [\eta]/([\eta]_{GPC} \times g_{SCB}^*) \quad \text{(I)}.$$

4 Claims, No Drawings

ETHYLENE-α-OLEFIN COPOLYMER AND MOLDED OBJECT THEREOF

CROSS-REFERENCE TO RELATED APPLICATIONS

This is the U.S. National Phase application of International Application PCT/JP2009/069418, filed Nov. 10, 2009, and claims priority benefit under 35 U.S.C. §119 based on Japanese Application No. 2008-288496, filed Nov. 11, 2008, the entire disclosures of which applications are hereby incorporated herein by reference.

FIELD OF THE INVENTION

The present invention relates to an ethylene-α-olefin copolymer and a molded object produced by extrusion molding of the ethylene-α-olefin copolymer.

BACKGROUND OF THE INVENTION

As a film, sheet, vessel, or the like used for packaging of foods, medicines, miscellaneous daily goods, and the like, in many cases there is used a molded object produced by extrusion molding of an ethylene-α-olefin copolymer. As such an ethylene-α-olefin copolymer, there are known an ethylene-1-butene copolymer, which satisfies a specific relation between melt tension and melt flow rate, and which satisfies a specific relation between the maximum peak temperature in endothermic curve as measured by a differential scanning calorimeter and density (cf., for example, Patent Document 1), and an ethylene-1-hexene copolymer, which has an activation energy of flow of not less than 50 kJ/mol, which satisfies a specific relation among melt flow rate, density, and the proportion of a portion soluble in cold xylene, and which has a heat of melting of the portion soluble in cold xylene of not less than 30 J/g (cf., for example, Patent Document 2). Patent Document 1 discloses that the ethylene-α-olefin copolymer is excellent in melt tension and has narrow composition distribution, and Patent Document 2 discloses that the ethylene-α-olefin copolymer is excellent in balance between extrusion molding processability and anti-block properties of extruded articles.

[Patent Document 1] JP-A-4-213309
[Patent Document 2] JP-A-2005-97481

BRIEF SUMMARY OF THE INVENTION

However, in the above ethylene-α-olefin copolymers, though mechanical strength and molding processability were improved, the level of molding processability was not sufficient, and it was requested to enhance molding processability furthermore.

Under such situations, the problem to be solved by the present invention resides in providing an ethylene-α-olefin copolymer, which has a short relaxation time and a high melt tension but a small neck-in, and a molded object produced by extrusion molding of the copolymer.

That is, the first aspect of the present invention relates to an ethylene-α-olefin copolymer having a monomer unit based on ethylene and a monomer unit based on an α-olefin having 3 to 20 carbon atoms, which has a melt flow rate (MFR) of 0.1 to 100 g/10 min, a density (d) of 850 to 940 kg/m³, a ratio (Mw/Mn) of weight average molecular weight (Mw) to number average molecular weight (Mn) of 2 to 12, and a value g* defined by the following formula (I) of 0.50 to 0.75:

$$g^* = [\eta]/([\eta]_{GPC} \times g_{SCB}^*) \tag{I},$$

wherein [η] stands for intrinsic viscosity (unit: dl/g) of the ethylene-α-olefin copolymer and is defined by the following formula (I-I):

$$[\eta] = 23.3 \times \log(\eta \text{rel}) \tag{I-I},$$

wherein ηrel stands for relative viscosity of the ethylene-α-olefin copolymer, $[\eta]_{GPC}$ is defined by the following formula (I-II):

$$[\eta]_{GPC} = 0.00046 \times Mv^{0.725} \tag{I-II},$$

wherein Mv stands for viscosity average molecular weight of the ethylene-α-olefin copolymer, and $g_{SCB}^*$ is defined by the following formula (I-III):

$$g_{SCB}^* = (1-A)^{1.725} \tag{I-III},$$

wherein A can be obtained directly by measuring short chain branch content in the ethylene-α-olefin copolymer.

The second aspect of the present invention relates to a molded object produced by extrusion molding of the above-mentioned ethylene-α-olefin copolymer.

ADVANTAGES OF THE INVENTION

The present invention can provide an ethylene-α-olefin copolymer, which has a short relaxation time and a high melt tension but a small neck-in, and a molded object produced by extrusion molding of the copolymer.

DETAILED DESCRIPTION OF THE INVENTION

The ethylene-α-olefin copolymer of the present invention is an ethylene-α-olefin copolymer containing a monomer unit based on ethylene and a monomer unit based on an α-olefin having 3 to 20 carbon atoms. The α-olefin includes propylene, 1-butene, 1-pentene, 1-hexene, 1-heptene, 1-octene, 1-nonene, 1-decene, 1-dodecene, 4-methyl-1-pentene, 4-methyl-1-hexene, and the like. These may be used singly or in a combination of two or more kinds. The α-olefin is preferably 1-butene, 1-hexene, 4-methyl-1-pentene, or 1-octene.

The ethylene-α-olefin copolymer of the present invention may have a monomer unit based on another monomer in a range wherein effects of the present invention are not impaired, in addition to the above-mentioned monomer unit based on ethylene and monomer unit based on an α-olefin having 3 to 20 carbon atoms. The other monomer includes, for example, a conjugated diene (for example, butadiene or isoprene), a non-conjugated diene (for example, 1,4-pentadiene), acrylic acid, acrylic acid ester (for example, methyl acrylate or ethyl acrylate), methacrylic acid, methacrylic acid ester (for example, methyl methacrylate or ethyl methacrylate), vinyl acetate, and the like.

The content of a monomer unit based on ethylene in the ethylene-α-olefin copolymer of the present invention is generally 50 to 99.5 weight % based on the total weight (100 weight %) of the ethylene-α-olefin copolymer. In addition, the content of a monomer unit based on an α-olefin is generally 0.5 to 50 weight % based on the total weight (100 weight %) of the ethylene-α-olefin copolymer.

The ethylene-α-olefin copolymer of the present invention is preferably a copolymer having a monomer unit based on ethylene and a monomer unit based on an α-olefin having 4 to 20 carbon atoms, more preferably a copolymer having a monomer unit based on ethylene and a monomer unit based on an α-olefin having 5 to 20 carbon atoms, and further more preferably a copolymer having a monomer unit based on ethylene and a monomer unit based on an α-olefin having 6 to 8 carbon atoms. In case the carbon number of the α-olefin to be copolymerized with the monomer unit based on ethylene small, even if much amount of the α-olefin is copolymerized, a density of the ethylene-α-olefin copolymer may not be decreased and an amount of sticky components may be increased. The quantity of the sticky components can be determined by measuring cold xylene soluble fraction (CXS) etc.

The ethylene-α-olefin copolymer of the present invention includes, for example, ethylene-1-butene copolymer, ethylene-1-hexene copolymer, ethylene-4-methyl-1-pentene copolymer, ethylene-1-octene copolymer, ethylene-1-butene-1-hexene copolymer, ethylene-1-butene-4-methyl-1-pentene copolymer, ethylene-1-butene-1-octene copolymer, ethylene-1-hexene-1-octene copolymer, and the like. It is preferably ethylene-1-hexene copolymer, ethylene-4-methyl-1-pentene copolymer, ethylene-1-butene-1-hexene copolymer, ethylene-1-butene-1-octene copolymer, or ethylene-1-hexene-1-octene copolymer.

The melt flow rate (hereinafter, sometimes referred to as "MFR") of the ethylene-α-olefin copolymer of the present invention ranges from 0.1 to 100 g/10 min. The melt flow rate is preferably not less than 0.2 g/10 min from the viewpoint of enhancing molding processability, particularly from the viewpoint of lowering extrusion load. Furthermore, it is preferably not more than 50 g/10 min, more preferably not more than 30 g/10 min, and further more preferably not more than 20 g/10 min from the viewpoint of enhancing melt tension and the mechanical strength of the resultant molded object. The melt flow rate is a value measured by A method under the conditions of 190° C. temperature and 21.18 N load in the method as stipulated in JIS K7210-1995. In addition, in measurement of the melt flow rate, generally there is used the ethylene-α-olefin copolymer wherein approximately 1,000 ppm of an antioxidant has been previously incorporated. Moreover, the melt flow rate of the ethylene-α-olefin copolymer can be changed, for example, by hydrogen concentration or polymerization temperature in the production process as mentioned later, and increasing hydrogen concentration or polymerization temperature makes the melt flow rate of the ethylene-α-olefin copolymer larger.

The density (hereinafter, sometimes referred to as "d") of the ethylene-α-olefin copolymer of the present invention ranges from 850 to 940 kg/m$^3$, and is preferably not more than 930 kg/m$^3$ from the viewpoint of enhancing impact strength among mechanical strengths of the resultant molded object. From the viewpoint of enhancing tensile strength among mechanical strengths of the resultant molded object, it is preferably not less than 870 kg/m$^3$, more preferably not less than 880 kg/m$^3$, and further more preferably not less than 890 kg/m$^3$, and conspicuously preferably not less than 900 kg/m$^3$. In addition, the density is measured in accordance with the method as stipulated in A method of JIS K7112-1980 after conducting of the annealing as stated in JIS K6760-1995. Furthermore, the density of the ethylene-α-olefin copolymer can be changed by the content of a monomer unit based on ethylene in the ethylene-α-olefin copolymer.

The ratio (hereinafter, sometimes referred to as "Mw/Mn") of weight average molecular weight (hereinafter, sometimes referred to as "Mw") to number average molecular weight (hereinafter, sometimes referred to as "Mn") of the ethylene-α-olefin copolymer of the present invention ranges from 2 to 12. When Mw/Mn is too small, extrusion load at the time of molding becomes high sometimes. Mw/Mn is preferably not less than 2.5, more preferably not less than 3, further preferably not less than 3.5, further more preferably not less than 4, and most preferably not less than 5. When Mw/Mn is too large, mechanical strength of the resultant molded object becomes low sometimes or an amount of low molecular weight components leading to sticky components of an molded object becomes large sometimes. The quantity of the sticky components can be determined by measuring cold xylene soluble fraction (CXS) etc. Mw/Mn is preferably not more than 10, more preferably not more than 8, and further more preferably not more than 6.5. The molecular weight distribution, Mw/Mn, can be controlled by regulating several kinds of polymerization conditions. For example, the molecular weight distribution can be controlled by changing a polymerization temperature. In addition, the molecular weight distribution can be controlled by regulating a difference between a hydrogen concentration in a system at the time of polymerization start and a hydrogen concentration in a system at the time of polymerization end by regulating a hydrogen concentration in a feed gas.

Mw/Mn is a value (Mw/Mn) obtained by measuring weight average molecular weight (Mw) and number average molecular weight (Mn) by gel permeation chromatograph (GPC) method and dividing Mw by Mn. In addition, measurement conditions in GPC method include, for example, the following conditions.

(1) Apparatus: Waters 150C manufactured by Waters Co., Ltd.
(2) Separation columns: TOSOH TSK gel GMH6-HT
(3) Measurement temperature: 140° C.
(4) Carrier: ortho-dichlorobenzene
(5) Flow rate: 1.0 mL/min
(6) Poured Amount: 500 μL
(7) Detector: differential refractometer
(8) Molecular weight standard substance: standard polystyrene The value g* defined by the following formula (I) of the ethylene-α-olefin copolymer of the present invention ranges from 0.50 to 0.75. (With regard to g*, the following literatures were referred to: Developments in Polymer Characterisation-4, J. V. Dawkins, Ed., Applied Science, London, 1983, Chapter I "Characterization of Long Chain Branching in Polymers" written by Th. G. Scholte.):

$$g^* = [\eta]/([\eta]_{GPC} \times g_{SCB}^*) \quad \text{(I)},$$

wherein [η] stands for intrinsic viscosity (unit: dl/g) of the ethylene-α-olefin copolymer and is defined by the following formula (I-I):

$$[\eta] = 23.3 \times \log(\eta rel) \quad \text{(I-I)},$$

wherein ηrel stands for relative viscosity of the ethylene-α-olefin copolymer,

[η]$_{GPC}$ is defined by the following formula (I-II):

$$[\eta]_{GPC} = 0.00046 \times Mv^{0.725} \quad \text{(I-II)},$$

wherein Mv stands for viscosity average molecular weight of the ethylene-α-olefin copolymer, and g$_{SCB}$* is defined by the following formula (I-III):

$$g_{SCB}^* = (1-A)^{1.725} \quad \text{(I-III)},$$

wherein A can be obtained directly by measuring short chain branch content in the ethylene-α-olefin copolymer.

[η]$_{GPC}$ stands for intrinsic viscosity (unit: dl/g) of a polymer, the molecular weight distribution of which is assumed to be the same as that of the ethylene-α-olefin copolymer, and the molecular chains of which are assumed to be linear.

g$_{SCB}$* stands for the contribution to g*, which generated by introducing short chain branches into the ethylene-α-olefin copolymer.

Formula (I-II) was quoted from the formula described in Journal of Polymer Science, 36, 130 (1959), pages 287-294 written by L. H. Tung.

Relative viscosity (ηrel) of the ethylene-α-olefin copolymer is calculated by dissolving 100 mg of the ethylene-α-olefin copolymer at 135° C. in 100 ml of tetralin solution containing 0.5 weight % of butylhydroxytoluene (BHT) as a heat deterioration inhibitor to prepare a sample solution, measuring fall times of the sample solution and a blank solution consisting of a tetralin solution containing 0.5 weight % of BHT only as a heat deterioration inhibitor by use of Ubbelohde type viscometer, and using the resultant fall times.

Viscosity average molecular weight (Mv) of the ethylene-α-olefin copolymer is defined by the following formula (I-IV):

$$M_V = \left( \frac{\sum_{\mu=1}^{\infty} M_\mu^{a+1} n_\mu}{\sum_{\mu=1}^{\infty} M_\mu n_\mu} \right)^{1/a} \quad \text{(I-IV)}$$

wherein a is 0.725, and $n_\mu$ stands for the number of molecules of a molecular weight $M_\mu$.

With regard to A in formula (I-III), when the number of branch carbons in a short chain branch is indicated as e (for example, when butene is used as an α-olefin, e=2; and when hexene is used, e=4) and the number of short chain branches per 1,000 carbons obtained by NMR or infrared spectroscopy is indicated as f, A can be estimated in accordance with the following formula.

$$A=((12\times e+2e+1)\times f)/((1000-2f-2)\times 14+(f+2)\times 15+f\times 13)$$

The mark, g* is an index indicating the shrinkage degree of a molecule in a solution, which is due to long chain branching, and when long chain branch content per molecular chain is much, shrinkage of molecular chains becomes large and g* becomes small. The mark, g* of the ethylene-α-olefin copolymer is preferably not more than 0.73, more preferably not more than 0.7, from the viewpoint of having a short relaxation time and giving sufficient processability, particularly strain hardening characteristics. When g* large, long chain branches are not contained sufficiently, and hence sufficient strain hardening characteristics cannot be obtained. Meanwhile, although it is possible that g* is large and a strain hardening characteristics is obtained, in that event, only a polymer having a long relaxation time can be obtained because it is necessary to lengthen a length of a chain of long chain branches. In addition, g* of the ethylene-α-olefin copolymer is preferably not less than 0.55 from the viewpoint of enhancing mechanical strength. When g* is too small, expansion of molecular chains at the time when crystals are formed, is too small, and hence generation probability of tie molecules decreases and strength is lowered. g* can be controlled by regulating a polymerization temperature together with selecting the after-mentioned transition metal compound. g* has a tendency to become a large value when a polymerization temperature is elevated.

Swell ratio (hereinafter, sometimes referred to as "SR") of the ethylene-α-olefin copolymer of the present invention is preferably not less than 1.55, more preferably not less than 1.6, further more preferably not less than 1.65, and particularly preferably not less than 1.7 from the viewpoint of lowering the neck-in at the time of molding flat die film. The swell ratio is preferably not more than 2.5, more preferably not more than 2.1, from the viewpoint of enhancing taking-up property at the time of extrusion molding. The swell ratio is a value ($D/D_0$) obtained by extruding a strand of the ethylene-α-olefin copolymer at a length of about 15 to 20 mm from an orifice under the conditions of 190° C. temperature and 21.18 N load in measuring melt flow rate (MFR) to cool it in the air, measuring the diameter D (unit: mm) of the resultant solid strand at the position of about 5 mm from the extruded upstream end, and dividing the diameter D by the diameter of the orifice, 2.095 mm ($D_0$). In addition, the swell ratio can be changed by, for example, hydrogen concentration or electron-donating compound concentration in the production process as mentioned later.

Melt flow rate ratio (hereinafter, sometimes referred to as "MFRR") of the ethylene-α-olefin copolymer of the present invention is preferably not less than 30, more preferably not less than 40, further more preferably not less than 50, and most preferably not less than 70, from the viewpoint of more lowering extrusion load at the time of molding. In addition, it preferably not more than 300, more preferably not more than 250, further more preferably not more than 200, and most preferably not more than 100, from the viewpoint of more enhancing mechanical strength of the resultant molded object. The MFRR is a value obtained by dividing melt flow rate (hereinafter, sometimes referred to as "H-MFR") measured under the conditions of 211.82 N load and 190° C. temperature in the method as stipulated in JIS K7210-1995 by melt flow rate (hereinafter, sometimes referred to as "MFR") measured under the conditions of 21.18 N load and 190° C. temperature in the method as stipulated in JIS K7210-1995. In addition, MFRR can be changed by, for example, hydrogen concentration in the production process as mentioned later, and increasing hydrogen concentration makes MFRR of the ethylene-α-olefin copolymer small.

The ethylene-α-olefin copolymer of the present invention has preferably branches not shorter than hexyl group from the viewpoint of enhancing melt tension and enhancing bubble stability and the viewpoint of preventing neck-in at the time of molding, and the number of long chain branches (hereinafter, sometimes referred to as "$N_{LCB}$") measured by NMR is preferably not less than 0.3. In addition, it is preferably not more than 1.0, more preferably not more than 0.7, most preferably not more than 0.5, from the viewpoint of enhancing mechanical strength of the molded object. The ethylene-α-olefin copolymer having a preferable range of $N_{LCB}$ can be obtained by selecting the after-mentioned transition metal compound and by suitably controlling polymerization conditions such as a polymerization temperature, a polymerization pressure and a kind of a comonomer etc.

$N_{LCB}$ is obtained by measuring the area of a peak derived from methine carbon having a branch of 5 or more carbon atoms bonded thereto, provided that the sum of areas of all peaks observed at 5 to 50 ppm is 1000, from the $^{13}$C-NMR spectrum measured by carbon nuclear magnetic resonance ($^{13}$C-NMR) method. The peak derived from methine carbon having a branch of 5 or more carbon atoms bonded thereto is observed at approximately 38.2 ppm (cf. academic literature "Macromolecules", USA, American Chemical Society, 1999, Vol. 32, pages 3817-3819). The position of this peak derived from methine carbon having a branch of 5 or more carbon atoms bonded thereto sometimes shifts depending on measurement equipments and measurement conditions, and hence generally, with regard to every measurement equipment and measurement condition, measurement of a sample is conducted for decision. In addition, for analysis of the spectrum, it is preferable to use a negative exponential function as a window function.

The activation energy (hereinafter, sometimes referred to as "Ea") of flow of the ethylene-α-olefin copolymer is preferably not less than 55 kJ/mol, and more preferably not less than 60 kJ/mol from the viewpoint of more lowering extrusion load at the time of molding. In addition, the activation energy of flow preferably not more than 150 kJ/mol, more preferably not more than 130 kJ/mol, further preferably not more than 110 kJ/mol, further more preferably not more than 90 kJ/mol, and most preferably not more than 80 kJ/mol, from the viewpoint of enhancing taking-up property at the time of extrusion molding.

Activation energy (Ea) of flow is a numerical value calculated by Arrhenius type equation from the shift factor ($a_r$) in preparing a master curve showing the dependency of melting complex viscosity (unit: Pa·sec) on angular frequency (unit: rad/sec) at 190° C. on the basis of temperature-time superposition principle, and is a value obtained by the method as stated below. That is, with regard to temperatures of 130° C., 150° C., 170° C., and 190° C., a shift factor ($a_r$) at each temperature (T) is obtained by superposing melting complex viscosity (unit: Pa·sec)-angular frequency (unit: rad/sec) curves of an ethylene-α-olefin copolymer at the respective temperatures (T, unit: ° C.) on melting complex viscosity-angular frequency curve of the ethylene-α-olefin copolymer at 190° C. on the basis of temperature-time superposition principle about every melting complex viscosity-angular frequency curve at each temperature (T), and then a linear approximate equation (the following formula (II)) of [ln($a_r$)] and [1/(T+273.16)] is calculated by the least-square method from the temperatures (T) and the shift factor ($a_r$) at each temperature (T). Subsequently, Ea is obtained from the gradient h of the primary expression and the following formula (III).

$$\ln(a_r)=h(1/(T+273.16))+i \quad \text{(II)}$$

$a_r$: shift factor
T: temperature (unit: ° C.)
h: gradient
i: intercept $$Ea=|0.008314 \times h| \quad \text{(III)}$$

Ea: activation energy of flow (unit: kJ/mol)
For the above calculations a commercially available calculation software may be used, and the calculation software includes Rhios V.4.4.4 manufactured by Rheometrics Co. and the like.

In this connection, the shift factor ($a_r$) is shift amount when both logarithmic curves of melting complex viscosity-angular frequency at the respective temperatures (T) are shifted to the direction of log (Y)=−log(X) axis, provided that Y-axis indicates melting complex viscosity and X-axis indicates angular frequency, and are superposed on melting complex viscosity-angular frequency curve at 190° C. In the superposition, both logarithmic curves of melting complex viscosity-angular frequency at the respective 15-temperatures (T) are shifted to $a_r$ times in angular frequency and to $1/a_r$ times in melting complex viscosity, with regard to every curve. In addition, the correlation coefficient in calculating the formula (II) by the least-square method from the values at four points of 130° C., 150° C., 170° C., and 190° C., is generally not less than 0.99.

Measurement of the melting complex viscosity-angular frequency curve is carried out generally under the conditions of geometry: parallel plates, plate diameter: 25 mm, distance between plates: 1.5 to 2 mm, strain: 5%, and angular frequency: 0.1 to 100 rad/sec by use of a viscoelasticity-measuring apparatus (for example, Rheometrics Mechanical Spectrometer RMS-800 manufactured by Rheometrics Co., or the like). In addition, the measurement is carried out under nitrogen atmosphere, and it is preferable to previously incorporate an adequate amount (for example, 1,000 ppm) of an antioxidant in a measurement sample.

Stretch viscosity nonlinear index number, k, representing a strength of a strain hardening of the ethylene-α-olefin copolymer of the present invention is preferably 0.4 or more, more preferably 0.5 or more, further preferably 0.6 or more, further more preferably 0.7 or more, most preferably 0.8 or more. Small k means that a sufficient strain hardening is not shown, and may generate a problem in processing in several kinds of moldings. The stretch viscosity nonlinear index number, k, is preferably 1.4 or less. When k is too large, it is expected that a melt elasticity becomes to strong to come to difficult to be formed into a desired shape.

Stretch viscosity nonlinear index number, k, is a value calculated as a gradient of ln α(t) between 1.2 seconds to 1.5 second of t in relation to the following curve:

$$\alpha(t)=\sigma_1(t)/\sigma_{0.1}(t) \quad (5),$$

wherein the above curve is obtained by dividing a viscosity-time curve $\sigma_1(t)$ of a molten resin uniaxially stretched at a strain rate of 1 s$^{-1}$ in Hencky strain and a temperature of 130° C. by a viscosity-time curve $\sigma_{0.1}(t)$ of a molten resin uniaxially stretched at a strain rate of 0.1 s$^{-1}$ in Hencky strain and a temperature of 130° C.

Measurement of a viscosity-time curve σ(t) of a molten resin is conducted by using a viscoelasticity measuring apparatus (e.g. ARES available from TA Instruments Corp.). The measurement is conducted at a nitrogen atmosphere.

The ethylene-α-olefin copolymer of the present invention is a copolymer having plural melting peaks existing at a range from 25° C. to a melt end temperature in a melting curve obtained from a differential scanning calorimetry of an ethylene-α-olefin copolymer. The phrase "having plural melting peaks" means that (a) melting peak(s) other than a maximum melting peak (a melting peak having a maximum peak height) exist(s) in a melting curve of an ethylene-α-olefin copolymer, and means that a composition distribution of the ethylene-α-olefin copolymer (i.e. a distribution of content proportions of monomer units among respective polymer components contained in the ethylene-α-olefin copolymer) is broad. More number of the melting peaks has a tendency that a heat-sealable temperature range of a resin becomes broad in relation to a resin having an identical density. In case the aftermentioned transition metal compound is used, a copolymer having plural melting peaks existed can be obtained by using a transition metal compound containing both meso compound and racemic body The melting curve of an ethylene-α-olefin copolymer can be obtained from a differential scanning calorimetry curve obtained in the following measurement (4) by using a differential scanning calorimeter (e.g. DSC-7 type available from Perkin-Elmer Corp.), by e.g. (1) retaining an aluminum pan tightly enclosing about 10 mg of a sample at 150° C. for 5 minutes, (2) decreasing the temperature from 150° C. to 20° C. at a rate of 5° C./minute, (3) retaining the temperature at 20° C. for 2 minutes, and (4) increasing the temperature from 20° C. up to a temperature of a melt end temperature plus about 20° C. (generally about 150° C.) at a rate of 5° C./minute.

A process for producing the ethylene-α-olefin copolymer of the present invention includes a process of copolymerizing ethylene and an α-olefin in the presence of a polymerization catalyst formed by contacting the following component (A), the following component (B), and the following component (C).

Component (A): a Transition Metal Compound Represented by the Following General Formula (1)

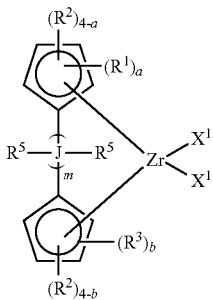

(1)

In the formula, $R^1$ and $R^3$ each independently stand for an aryl group having 6 to 20 carbon atoms, which may be substituted, $R^2$ and $R^4$ each independently stand for a hydrogen atom or a hydrocarbyl group having 1 to 20 carbon atoms, which may be substituted, a and b each independently stand for an integer of 0 to 4, and at least one of a and b stands for an integer of 1 or more, when $R^1$ to $R^4$ are respectively plural, plural $R^1$s to $R^4$s respectively may be same as or different from each other, $X^1$ stands for a hydrogen atom, a halogen atom, a hydrocarbyl group having 1 to 20 carbon atoms, which may be substituted, a hydrocarbyloxy group having 1 to 20 carbon atoms, which may be substituted, a substituted silyl group having 1 to 20 carbon atoms, or a substituted amino group having 1 to 20 carbon atoms, and two $X^1$ may be same as or different from each other, m stands for an integer of 1 to 5, J stands for carbon atom or silicon atom, and when plural J are present, the plural J may be same as or different from each other, and $R^5$ stands for a hydrogen atom or a hydrocarbyl group having 1 to 20 carbon atoms, which may be substituted, and plural $R^5$s may be same as or different from each other.

Component (B): a Solid Catalyst Component Formed by Contacting the Following Component (a), the Following Component (b), the Following Component (c), and the Following Component (d).

Component (a): a Compound Represented by the Following General Formula (2)

$$ZnL_2 \qquad (2)$$

Component (b): a Compound Represented by the Following General Formula (3)

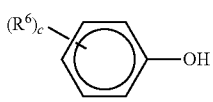

(3)

Component (c): $H_2O$
Component (d): $SiO_2$

In the formulas, L stands for a hydrocarbyl group having 1 to 20 carbon atoms, which may be substituted, and two L may be same as or different from each other, $R^6$ stands for an electron-withdrawing group or a group containing an electron-withdrawing group, c stands for an integer of 1 to 5, and when plural $R^6$s are present, the plural $R^6$s may be same as or different from each other.

Component (C): an Organic Aluminium Compound $R^1$ and $R^3$ in the general formula (1) each independently stand for an aryl group having 6 to 20 carbon atoms, which may be substituted, and when plural $R^1$s are present, the plural $R^1$s may be same as or different from each other, and when plural $R^3$s are present, the plural $R^3$s may be same as or different from each other.

The aryl group having 6 to 20 carbon atoms, which may be substituted, indicated by $R^1$ and $R^3$, includes an aryl group having 6 to 20 carbon atoms, an aryl group having 6 to 20 carbon atoms substituted with a halogen atom, an aryl group having 6 to 20 carbon atoms substituted with a substituted silyl group having 1 to 20 carbon atoms, an aryl group having 6 to 20 carbon atoms substituted with a substituted amino group having 1 to 20 carbon atoms, an aryl group having 6 to 20 carbon atoms substituted with a hydrocarbyloxy group having 1 to 20 carbon atoms, and the like.

The aryl group having 6 to 20 carbon atoms includes, for example, phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, diethylphenyl group, triethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, and the like.

The aryl group having 6 to 20 carbon atoms substituted with a halogen atom includes, for example, 2-fluorophenyl group, 3-fluorophenyl group, 4-fluorophenyl group, 2-chlorophenyl group, 3-chlorophenyl group, 4-chlorophenyl group, 2-bromophenyl group, 3-bromophenyl group, 4-bromophenyl group, 2-iodophenyl group, 3-iodophenyl group, 4-iodophenyl group, and the like.

The aryl group having 6 to 20 carbon atoms substituted with a substituted silyl group having 1 to 20 carbon atoms includes, for example, trimethylsilylphenyl group, bis(trimethylsilyl)phenyl group, and the like.

The aryl group having 6 to 20 carbon atoms substituted with a substituted amino group having 1 to 20 carbon atoms includes, for example, dimethylaminophenyl group, bis(dimethylamino)phenyl group, diphenylaminophenyl group, and the like.

The aryl group having 6 to 20 carbon atoms substituted with a hydrocarbyloxy group having 1 to 20 carbon atoms includes, for example, methoxyphenyl group, ethoxyphenyl group, n-propoxyphenyl group, isopropoxyphenyl group, n-butoxyphenyl group, sec-butoxyphenyl group, tert-butoxyphenyl group, phenoxyphenyl group, and the like.

$R^1$ and $R^3$ stand for preferably an aryl group having 6 to 20 carbon atoms, and more preferably phenyl group.

$R^2$ and $R^4$ in the general formula (1) each independently stand for a hydrogen atom or a hydrocarbyl group having 1 to 20 carbon atoms, which may be substituted, and when plural $R^2$s are present, the plural $R^2$s may be same as or different from each other, and when plural $R^4$s are present, the plural $R^4$s may be same as or different from each other.

The hydrocarbyl group having 1 to 20 carbon atoms, which may be substituted, indicated by $R^2$ and $R^4$, includes an alkyl group having 1 to 20 carbon atoms, which may be substituted, an aralkyl group having 7 to 20 carbon atoms, which may be substituted, an aryl group having 6 to 20 carbon atoms, which may be substituted, and the like.

The alkyl group having 1 to 20 carbon atoms, which may be substituted, includes an alkyl group having 1 to 20 carbon atoms, an alkyl group having 1 to 20 carbon atoms substituted with a halogen atom, an alkyl group having 1 to 20 carbon atoms substituted with a substituted silyl group having 1 to 20 carbon atoms, an alkyl group having 1 to 20 carbon atoms substituted with a substituted amino group having 1 to 20 carbon atoms, an alkyl group having 1 to 20 carbon atoms substituted with a hydrocarbyloxy group having 1 to 20 carbon atoms, and the like.

The alkyl group having 1 to 20 carbon atoms includes, for example, methyl group, ethyl group, n-propyl group, isopropyl group, n-butyl group, sec-butyl group, tert-butyl group, n-pentyl group, neopentyl group, isopentyl group, n-hexyl group, n-heptyl group, n-octyl group, n-decyl group, n-nonyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, and the like.

The alkyl group having 1 to 20 carbon atoms substituted with a halogen atom includes, for example, fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group, and the like.

The alkyl group having 1 to 20 carbon atoms substituted with a substituted silyl group having 1 to 20 carbon atoms includes, for example, trimethylsilylmethyl group, trimethylsilylethyl group, trimethylsilylpropyl group, trimethylsilylbutyl group, bis(trimethylsilyl)methyl group, bis(trimethylsilyl)ethyl group, bis(trimethylsilyl)propyl group, bis(trimethylsilyl)butyl group, triphenylsilylmethyl group, and the like.

The alkyl group having 1 to 20 carbon atoms substituted with a substituted amino group having 1 to 20 carbon atoms includes, for example, dimethylaminomethyl group, dimethylaminoethyl group, dimethylaminopropyl group, dimethylaminobutyl group, bis(dimethylamino)methyl group, bis(dimethylamino)ethyl group, bis(dimethylamino)propyl group, bis(dimethylamino)butyl group, phenylaminomethyl group, diphenylaminomethyl group, and the like.

The alkyl group having 1 to 20 carbon atoms substituted with a hydrocarbyloxy group having 1 to 20 carbon atoms includes, for example, methoxymethyl group, ethoxymethyl group, n-propoxymethyl group, isopropoxymethyl group, n-butoxymethyl group, sec-butoxymethyl group, tert-butoxymethyl group, phenoxymethyl group, methoxyethyl group, ethoxyethyl group, n-propoxyethyl group, isopropoxyethyl group, n-butoxyethyl group, sec-butoxyethyl group, tert-butoxyethyl group, phenoxyethyl group, methoxy-n-propyl group, ethoxy-n-propyl group, n-propoxy-n-propyl group, isopropoxy-n-propyl group, n-butoxy-n-propyl group, sec-butoxy-n-propyl group, tert-butoxy-n-propyl group, phenoxy-n-propyl group, methoxyisopropyl group, ethoxyisopropyl group, n-propoxyisopropyl group, isopropoxyisopropyl group, n-butoxyisopropyl group, sec-butoxyisopropyl group, tert-butoxyisopropyl group, phenoxyisopropyl group, and the like.

The aralkyl group having 7 to 20 carbon atoms, which may be substituted, includes an aralkyl group having 7 to 20 carbon atoms, an aralkyl group having 7 to 20 carbon atoms substituted with a halogen atom, and the like.

The aralkyl group having 7 to 20 carbon atoms includes, for example, benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, anthracenylmethyl group, phenylethyl group, phenylpropyl group, phenylbutyl group, diphenylmethyl group, diphenylethyl group, diphenylpropyl group, diphenylbutyl group, and the like.

The aralkyl group having 7 to 20 carbon atoms substituted with a halogen atom includes, for example, 2-fluorobenzyl group, 3-fluorobenzyl group, 4-fluorobenzyl group, 2-chlorobenzyl group, 3-chlorobenzyl group, 4-chlorobenzyl group, 2-bromobenzyl group, 3-bromobenzyl group, 4-bromobenzyl group, 2-iodobenzyl group, 3-iodobenzyl group, 4-iodobenzyl group, and the like.

The aryl group having 6 to 20 carbon atoms, which may be substituted, includes the same examples as those of the aryl group having 6 to 20 carbon atoms, which may be substituted, indicated by $R^1$ and $R^3$.

$R^2$ and $R^4$ stand for preferably a hydrogen atom, and an alkyl group having 1 to 6 carbon atoms, more preferably a hydrogen atom, and an alkyl group having 1 to 4 carbon atoms, and further more preferably a hydrogen atom.

In general formula (1), a and b each independently stand for an integer of 0 to 4, and at least one of a and b stands for an integer of 1 or more.

In general formula (1), $X^1$ stands for a hydrogen atom, a halogen atom, a hydrocarbyl group having 1 to 20 carbon atoms, which may be substituted, a hydrocarbyloxy group having 1 to 20 carbon atoms, which may be substituted, a substituted silyl group having 1 to 20 carbon atoms, or a substituted amino group having 1 to 20 carbon atoms, and two $X^1$ may be same as or different from each other.

The halogen atom indicated by $X^1$ includes fluorine atom, chlorine atom, bromine atom, iodine atom, and the like.

The hydrocarbyl group having 1 to 20 carbon atoms, which may be substituted, indicated by $X^1$, includes the same examples as those of the hydrocarbyl group having 1 to 20 carbon atoms, which may be substituted, indicated by $R^2$ and $R^4$.

The hydrocarbyloxy group having 1 to 20 carbon atoms, which may be substituted, indicated by $X^1$, includes an alkoxy group having 1 to 20 carbon atoms, which may be substituted, an aralkyloxy group having 7 to 20 carbon atoms, which may be substituted, an aryloxy group having 6 to 20 carbon atoms, which may be substituted, and the like.

The alkoxy group having 1 to 20 carbon atoms, which may be substituted, includes an alkoxy group having 1 to 20 carbon atoms, an alkoxy group having 1 to 20 carbon atoms substituted with a halogen atom, and the like.

The alkoxy group having 1 to 20 carbon atoms includes, for example, methoxy group, ethoxy group, n-propoxy group, isopropoxy group, n-butoxy group, sec-butoxy group, tert-butoxy group, n-pentyloxy group, neopentyloxy group, n-hexyloxy group, n-octyloxy group, n-nonyloxy group, n-decyloxy group, n-undecyloxy group, n-dodecyloxy group, n-tridecyloxy group, n-tetradecyloxy group, n-pentadecyloxy group, n-hexadecyloxy group, n-heptadecyloxy group, n-octadecyloxy group, n-nonadecyloxy group, n-eicosoxy group, and the like.

The alkoxy group having 1 to 20 carbon atoms substituted with a halogen atom includes, for example, fluoromethyloxy group, difluoromethyloxy group, trifluoromethyloxy group, chloromethyloxy group, dichloromethyloxy group, trichloromethyloxy group, bromomethyloxy group, dibromomethyloxy group, tribromomethyloxy group, iodomethyloxy group, diiodomethyloxy group, triiodomethyloxy group, fluoroethyloxy group, difluoroethyloxy group, trifluoroethyloxy group, tetrafluoroethyloxy group, pentafluoroethyloxy group, chloroethyloxy group, dichloroethyloxy group, trichloroethyloxy group, tetrachloroethyloxy group, pentachloroethyloxy group, bromoethyloxy group, dibromoethyloxy group, tribromoethyloxy group, tetrabromoethyloxy group, pentabromoethyloxy group, perfluoropropyloxy group, perfluorobutyloxy group, perfluoropentyloxy group, perfluorohexyloxy group, perfluorooctyloxy group, perfluorododecyloxy group, perfluoropentadecyloxy group, perfluoroeicosyloxy group, perchloropropyloxy group, perchlorobutyloxy group, perchloropentyloxy group, perchlorohexyloxy group, perchlorooctyloxy group, perchlorododecyloxy group, perchloropentadecyloxy group, perchloroeicosyloxy group, perbromopropyloxy group, perbromobutyloxy group, perbromopentyloxy group, perbromohexyloxy group, perbromooctyloxy group, perbromododecyloxy group, perbromopentadecyloxy group, perbromoeicosyloxy group, and the like.

The aralkyloxy group having 7 to 20 carbon atoms, which may be substituted, includes an aralkyloxy group having 7 to 20 carbon atoms, an aralkyloxy group having 7 to 20 carbon atoms substituted with a halogen atom, and the like.

The aralkyloxy group having 7 to 20 carbon atoms includes, for example, benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylphenyl)methoxy group, (n-butylphenyl)methoxy group, (sec-butylphenyl)methoxy group, (tert-butylphenyl)methoxy group, (n-hexylphenyl)methoxy group, (n-octylphenyl)methoxy group, (n-decylphenyl)methoxy group, (n-tetradecylphenyl)methoxy group, naphthylmethoxy group, anthracenylmethoxy group, and the like.

The aralkyloxy group having 7 to 20 carbon atoms substituted with a halogen atom includes, for example, 2-fluorobenzyloxy group, 3-fluorobenzyloxy group, 4-fluorobenzyloxy group, 2-chlorobenzyloxy group, 3-chlorobenzyloxy group, 4-chlorobenzyloxy group, 2-bromobenzyloxy group, 3-bromobenzyloxy group, 4-bromobenzyloxy group, 2-iodobenzyloxy group, 3-iodobenzyloxy group, 4-iodobenzyloxy group, and the like.

The aryloxy group having 6 to 20 carbon atoms, which may be substituted, includes an aryloxy group having 6 to 20 carbon atoms, an aryloxy group having 6 to 20 carbon atoms substituted with a halogen atom, and the like.

The aryloxy group having 6 to 20 carbon atoms includes, for example, phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group, and the like.

The aryloxy group having 6 to 20 carbon atoms substituted with a halogen atom includes, for example, 2-fluorophenyloxy group, 3-fluorophenyloxy group, 4-fluorophenyloxy group, 2-chlorophenyloxy group, 3-chlorophenyloxy group, 4-chlorophenyloxy group, 2-bromophenyloxy group, 3-bromophenyloxy group, 4-bromophenyloxy group, 2-iodophenyloxy group, 3-iodophenyloxy group, 4-iodophenyloxy group, and the like.

The substituted silyl group having 1 to 20 carbon atoms indicated by $X^1$, includes, for example, a monosubstituted silyl group substituted with a hydrocarbyl group having 1 to 20 carbon atoms, a disubstituted silyl group substituted with hydrocarbyl groups having 1 to 20 carbon atoms, a trisubstituted silyl group substituted with hydrocarbyl groups having 1 to 20 carbon atoms, and the like. The hydrocarbyl group having 1 to 20 carbon atoms includes, for example, an alkyl group having 1 to 20 carbon atoms, an aryl group having 6 to 20 carbon atoms, and the like. The monosubstituted silyl group substituted with a hydrocarbyl group having 1 to 20 carbon atoms, includes, for example, methylsilyl group, ethylsilyl group, n-propylsilyl group, isopropylsilyl group, n-butylsilyl group, sec-butylsilyl group, tert-butylsilyl group, isobutylsilyl group, n-pentylsilyl group, n-hexylsilyl group, phenylsilyl group, and the like. The disubstituted silyl group substituted with hydrocarbyl groups having 1 to 20 carbon atoms, includes, for example, dimethylsilyl group, diethylsilyl group, di-n-propylsilyl group, diisopropylsilyl group, di-n-butylsilyl group, di-sec-butylsilyl group, di-tert-butylsilyl group, diisobutylsilyl group, diphenylsilyl group, and the like. The trisubstituted silyl group substituted with hydrocarbyl groups having 1 to 20 carbon atoms, includes, for example, trimethylsilyl group, triethylsilyl group, tri-n-propylsilyl group, triisopropylsilyl group, tri-n-butylsilyl group, tri-sec-butylsilyl group, tri-tert-butylsilyl group, triisobutylsilyl group, tert-butyl-dimethylsilyl group, tri-n-pentylsilyl group, tri-n-hexylsilyl group, tricyclohexylsilyl group, triphenylsilyl group, and the like.

The substituted amino group having 1 to 20 carbon atoms indicated by $X^1$, includes, for example, an amino group substituted with a hydrocarbyl group having 1 to 20 carbon atoms. The hydrocarbyl group having 1 to 20 carbon atoms includes, for example, an alkyl group having 1 to 20 carbon atoms, an aryl group having 6 to 20 carbon atoms, and the like. The amino group substituted with a hydrocarbyl group having 1 to 20 carbon atoms, includes, for example, phenylamino group, benzylamino group, dimethylamino group, diethylamino group, di-n-propylamino group, diisopropylamino group, di-n-butylamino group, di-sec-butylamino group, di-tert-butylamino group, diisobutylamino group, di-n-hexylamino group, di-n-octylamino group, di-n-decylamino group, diphenylamino group, dibenzylamino group, tert-butylisopropylamino group, phenylethylamino group, phenylpropylamino group, phenylbutylamino group, pyrrolyl group, pyrrolidinyl group, piperidinyl group, carbazolyl group, dihydroisoindolyl group, and the like.

$X^1$ stands for preferably chlorine atom, methyl group, ethyl group, n-propyl group, isopropyl group, n-butyl group, methoxy group, ethoxy group, n-propoxy group, isopropoxy group, n-butoxy group, trifluoromethoxy group, phenyl group, phenoxy group, 2,6-di-tert-butylphenoxy group, 3,4,5-trifluorophenoxy group, pentafluorophenoxy group, 2,3,5,6-tetrafluoro-4-pentafluorophenylphenoxy group, and benzyl group.

In general formula (1), m is an integer of 1 to 5. Preferably, m is 1 or 2.

In general formula (1), J stands for carbon atom or silicon atom, and when plural J are present, the plural J may be same as or different from each other.

In general formula (1), $R^5$ each independently stand for a hydrogen atom or a hydrocarbyl group having 1 to 20 carbon atoms, which may be substituted, and plural $R^5$s may be same as or different from each other.

The hydrocarbyl group having 1 to 20 carbon atoms, which may be substituted, indicated by $R^5$, includes the same examples as those of the hydrocarbyl group having 1 to 20 carbon atoms, which may be substituted, indicated by $R^2$ and $R^4$.

In general formula (1), a cross-linking group represented by the following general formula (4)

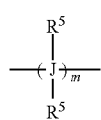

(4)

includes, for example, methylene group, ethylidene group, ethylene group, propylidene group, propylene group, butylidene group, butylene group, pentylidene group, pentylene group, hexylidene group, isopropylidene group, methylethylmethylene group, methylpropylmethylene group, methylbutylmethylene group, bis(cyclohexyl)methylene group, methylphenylmethylene group, diphenylmethylene group, phenyl(methylphenyl)methylene group, di(methylphenyl)methylene group, bis(dimethylphenyl)methylene group, bis(trimethylphenyl)methylene group, phenyl(ethylphenyl)methylene group, di(ethylphenyl)methylene group, bis (diethylphenyl)methylene group, phenyl(propylphenyl)methylene group, di(propylphenyl)methylene group, bis(dipropylphenyl)methylene group, phenyl(butylphenyl)methylene group, di(butylphenyl)methylene group, phenyl(naphthyl)methylene group, di(naphthyl)methylene group, phenyl(biphenyl)methylene group, di(biphenyl)methylene group, phenyl(trimethylsilylphenyl)methylene group, bis(trimethylsilylphenyl)methylene group, bis(pentafluorophenyl)methylnene group, silanediyl group, disilanediyl group, trisilanediyl group, tetrasilanediyl group, dimethylsilanediyl group, bis(dimethylsilane)diyl group, diethylsilanediyl group, dipropylsilanediyl group, dibutylsilanediyl group, diphenylsilanediyl group, silacyclobutanediyl group, silacyclohexanediyl group, divinylsilanediyl group, diallylsilanediyl group, (methyl)(vinyl)silanediyl group, (allyl)(methyl)silanediyl group, and the like.

The cross-linking group represented by general formula (4) is preferably methylene group, ethylene group, isopropylidene group, bis(cyclohexyl)methylene group, diphenylmethylene group, dimethylsilanediyl group, bis(dimethylsilane)diyl group, or diphenylsilanediyl group, and more preferably isopropylidene group, or dimethylsilanediyl group.

The transition metal compound represented by general formula (1) as component (A) includes, for example, dimethylsilylenebis(2-phenylcyclopentadienyl)zirconium dichloride, dimethylsilylenebis(3-phenylcyclopentadienyl)zirconium dichloride, dimethylsilylenebis(2,3-diphenylcyclopentadienyl)zirconium dichloride, dimethylsilylenebis(2,4-diphenylcyclopentadienyl)zirconium dichloride, dimethylsilylenebis(2,5-diphenylcyclopentadienyl)zirconium dichloride, dimethylsilylenebis(3,4-diphenylcyclopentadienyl)zirconium dichloride, dimethylsilylenebis(2,3,4-triphenylcyclopentadienyl)zirconium dichloride, dimethylsilylenebis(2,3,5-triphenylcyclopentadienyl)zirconium dichloride, and dimethylsilylenebis (tetraphenylcyclopentadienyl)zirconium dichloride, and compounds formed by substituting "dimethylsilylene" of these compounds with "methylene", "ethylene", "isopropylidene", "bis(cyclohexyl)methylene", "diphenylmethylene", "dimethylsilanediyl", "bis(dimethylsilane)diyl", or "diphenylsilanediyl", and compounds formed by substituting "dichloride" with "difluoride", "dibromide", "diiodide", "dimethyl", "diethyl", "diisopropyl", "diphenyl", "dibenzyl", "dimethoxide", "diethoxide", "di(n-propoxide)", "di (isopropoxide)", "diphenoxide", or "di(pentafluorophenoxide)", and the like.

The transition metal compound represented by general formula (1) as component (A) is preferably dimethylsilylenebis(3-phenylcyclopentadienyl)zirconium dichloride.

L in general formula (2) stands for a hydrocarbyl group having 1 to 20 carbon atoms, which may be substituted, and two L may be same as or different from each other.

The hydrocarbyl group having 1 to 20 carbon atoms, which may be substituted, indicated by L, includes an alkyl group having 1 to 20 carbon atoms, which may be substituted, an aralkyl group having 7 to 20 carbon atoms, which may be substituted, an aryl group having 6 to 20 carbon atoms, which may be substituted, and the like.

The alkyl group having 1 to 20 carbon atoms, which may be substituted, includes an alkyl group having 1 to 20 carbon atoms, an alkyl group having 1 to 20 carbon atoms substituted with a halogen atom, and the like.

The alkyl group having 1 to 20 carbon atoms includes, for example, methyl group, ethyl group, n-propyl group, isopropyl group, n-butyl group, sec-butyl group, tert-butyl group, n-pentyl group, neopentyl group, isopentyl group, n-hexyl group, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, and the like. It is preferably methyl group, ethyl group, isopropyl group, tert-butyl group, or isobutyl group.

The alkyl group having 1 to 20 carbon atoms substituted with a halogen atom includes, for example, fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group, and the like.

The aralkyl group having 7 to 20 carbon atoms, which may be substituted, includes an aralkyl group having 7 to 20 carbon atoms, an aralkyl group having 7 to 20 carbon atoms substituted with a halogen atom, and the like.

The aralkyl group having 7 to 20 carbon atoms includes, for example, benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl) methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, anthracenylmethyl group, phenylethyl group, phenylpropyl group, phenylbutyl group, diphenylmethyl group, diphenylethyl group, diphenylpropyl group, diphenylbutyl group, and the like. It is preferably benzyl group.

The aralkyl group having 7 to 20 carbon atoms substituted with a halogen atom includes, for example, 2-fluorobenzyl group, 3-fluorobenzyl group, 4-fluorobenzyl group, 2-chlorobenzyl group, 3-chlorobenzyl group, 4-chlorobenzyl group, 2-bromobenzyl group, 3-bromobenzyl group, 4-bromobenzyl group, 2-iodobenzyl group, 3-iodobenzyl group, 4-iodobenzyl group, and the like.

The aryl group having 6 to 20 carbon atoms, which may be substituted, includes an aryl group having 6 to 20 carbon atoms, an aryl group having 6 to 20 carbon atoms substituted with a halogen atom, and the like.

The aryl group having 6 to 20 carbon atoms includes, for example, phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, diethylphenyl group, triethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, and the like. It is preferably phenyl group.

The aryl group having 6 to 20 carbon atoms substituted with a halogen atom includes, for example, 2-fluorophenyl group, 3-fluorophenyl group, 4-fluorophenyl group, 2-chlorophenyl group, 3-chlorophenyl group, 4-chlorophenyl group, 2-bromophenyl group, 3-bromophenyl group, 4-bromophenyl group, 2-iodophenyl group, 3-iodophenyl group, 4-iodophenyl group, and the like.

L is preferably an alkyl group having 1 to 20 carbon atoms, or an aryl group having 6 to 20 carbon atoms, and more preferably an alkyl group having 1 to 20 carbon atoms.

The compound represented by general formula (2) as component (a) includes, for example, a dialkyl zinc, a diaryl zinc, a dialkenyl zinc, bis(cyclopentadienyl)zinc, a halogenated alkyl zinc, and the like. The dialkyl zinc includes, for example, dimethyl zinc, diethyl zinc, di-n-propyl zinc, diisoprpyl zinc, di-n-butyl zinc, diisobutyl zinc, di-n-hexyl zinc, and the like. The diaryl zinc includes, for example, diphenyl zinc, dinaphthyl zinc, bis(pentafluorophenyl)zinc, and the like. The dialkenyl zinc includes, for example, diallyl zinc, and the like. The halogenated alkyl zinc includes, for example, chlorinated methyl zinc, chlorinated ethyl zinc, chlorinated n-propyl zinc, chlorinated isopropyl zinc, chlorinated n-butyl zinc, chlorinated isobutyl zinc, chlorinated n-hexyl zinc, brominated methyl zinc, brominated ethyl zinc, brominated n-propyl zinc, brominated isopropyl zinc, brominated n-butyl zinc, brominated isobutyl zinc, brominated n-hexyl zinc, iodinated methyl zinc, iodinated ethyl zinc, iodinated n-propyl zinc, iodinated isopropyl zinc, iodinated n-butyl zinc, iodinated isobutyl zinc, iodinated n-hexyl zinc, and the like.

The compound represented by general formula (2) as component (a) is preferably a dialkyl zinc, more preferably dimethyl zinc, diethyl zinc, di-n-propyl zinc, diisoprpyl zinc, di-n-butyl zinc, diisobutyl zinc, or di-n-hexyl zinc, and particularly preferably dimethyl zinc, or diethyl zinc.

In general formula (3), $R^6$ stands for an electron-withdrawing group or a group-containing an electron-withdrawing group, and when plural $R^6$s are present, the plural $R^6$s may be same as or different from each other. As the index of electron-withdrawing, there is known the substituent constant σ of Hammett rule, or the like, and a functional group having a positive substituent constant σ of Hammett rule can be cited as an electron-withdrawing group.

The electron-withdrawing group indicated by $R^6$s includes, fluorine atom, chlorine atom, bromine atom, iodine atom, cyano group, nitro group, cabonyl group, sulfone group, phenyl group, and the like. The group-containing an electron-withdrawing group indicated by $R^6$, includes a halogenated alkyl group, a halogenated aryl group, a (halogenated alkyl)aryl group, a cyanoaryl group, a nitroaryl group, an ester group (an alkoxycarbonyl group, an aralkyloxycarbonyl group, or an aryloxycarbonyl group), an acyl group, and the like.

$R^6$ is preferably a halogen atom, more preferably fluorine atom, chlorine atom, bromine atom, or iodine atom, particularly preferably fluorine atom.

In general formula (3), c stands for an integer of 1 to 5.

The compound represented by general formula (3) as component (b) includes 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 3,4,5-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol, perfluoro-1-naphthol, perfluoro-2-naphthol, 2-chlorophenol, 3-chlorophenol, 4-chlorophenol, 2,4-dichlorophenol, 2,6-dichlorophenol, 3,4-dichlorophenol, 3,5-dichlorophenol, 2,4,6-trichlorophenol, 2,3,5,6-tetrachlorophenol, pentachlorophenol, 2,3,5,6-tetrachloro-4-trichloromethylphenol, 2,3,5,6-tetrachloro-4-pentachlorophenylphenol, perchloro-1-naphthol, perchloro-2-naphthol, 2-bromophenol, 3-bromophenol, 4-bromophenol, 2,4-dibromophenol, 2,6-dibromophenol, 3,4-dibromophenol, 3,5-dibromophenol, 2,4,6-tribromophenol, 2,3,5,6-tetrabromophenol, pentabromophenol, 2,3,5,6-tetrabromo-4-tribromomethylphenol, 2,3,5,6-tetrabromo-4-pentabromophenylphenol, perbromo-1-naphthol, perbromo-2-naphthol, 2-iodophenol, 3-iodophenol, 4-iodophenol, 2,4-diiodophenol, 2,6-diiodophenol, 3,4-diiodophenol, 3,5-diiodophenol, 2,4,6-triiodophenol, 2,3,5,6-tetraiodophenol, pentaiodophenol, 2,3,5,6-tetraiodo-4-triiodomethylphenol, 2,3,5,6-tetraiodo-4-pentaiodophenylphenol, periodo-1-naphthol, periodo-2-naphthol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 2-cyanophenol, 3-cyanophenol, 4-cyanophenol, 2-nitrophenol, 3-nitrophenol, 4-nitrophenol, and the like.

The compound represented by general formula (3) as component (b) is preferably 3,4,5-trifluorophenol.

$SiO_2$ as component (d) has preferably even particle diameters, and the volume-based geometrical standard deviation of particle diameters of $SiO_2$ as component (d) is preferably not more than 2.5, more preferably not more than 2.0, and further more preferably not more than 1.7.

The average particle diameter of $SiO_2$ is generally 1 to 5,000 μm, preferably 5 to 1,000 μm, more preferably 10 to 500 μm, and further more preferably 10 to 100 μm. The pore volume thereof is preferably not less than 0.1 ml/g, and more preferably 0.3 to 10 ml/g. The specific surface area thereof is preferably 10 to 1,000 $m^2$/g, and more preferably 100 to 500 $m^2$/g.

In addition, $SiO_2$ generally has hydroxyl groups on its surface, and as $SiO_2$ there may be used modified $SiO_2$ wherein active hydrogens of hydroxyl groups on the surface are substituted with various substituents. The modified $SiO_2$ includes the $SiO_2$, which has been contacted with, for example, a trialkylchlorosilane, a triarylchlorosilane, a dialkyldichlorosilane, a diaryldichlorosilane, an alkyltrichlorosilane, an aryltrichlorosilane, a trialkylalkoxysilane, a triarylalkoxysilane, a dialkyldialkoxysilane, a diaryldialkoxysilane, an aryltrialkoxysilane, a tetraalkoxysilane, an alkyldisilazane, tetrachlorosilane, an alcohol, a phenol, a dialkylmagnesium, an alkyllithium, or the like. The trialkylchlorosilane includes, for example, trimethylchlorosilane, tert-butyldimethylchlorosilane, and the like. The triarylchlorosilane includes, for example, triphenylchlorosilane and the like. The dialkyldichlorosilane includes, for example, dimethyldichlorosilane, and the like. The diaryldichlorosilane includes, for example, diphenyldichlorosilane, and the like. The alkyltrichlorosilane includes, for example, methyltrichlorosilane, and the like. The aryltrichlorosilane includes, for example, phenyltrichlorosilane, and the like. The trialkylalkoxysilane includes, for example, trimethylmethoxysilane, and the like. The triarylalkoxysilane includes, for example, triphenylmethoxysilane, and the like. The dialkyldialkoxysilane includes, for example, dimethyldimethoxysilane, and the like. The diaryldialkoxysilane includes, for example, diphenyldimethoxysilane, and the like. The alkyltrialkoxysilane includes, for example, methyltrimethoxysilane, and the like. The aryltrialkoxysilane includes, for example, phenyltrimethoxysilane, and the like. The tetraalkoxysilane includes, for example, tetramethoxysilane, and the like. The alkyldisilazane includes, for example, 1,1,1,3,3,3-hexamethyldisilazane, and the like. The alcohol includes, for example, methanol, ethanol, and the like. The dialkylmagnesium includes, for example, dibutylmagnesium, butylethylmagnesium, butyloctylmagnesium, and the like. The alkyllithium includes, for example, butyllithium, and the like.

Furthermore, there is included the $SiO_2$, which has been contacted with a dialkylamine, an alcohol, a phenol, or the like after contact with a trialkylaluminium. The dialkylamine includes, for example, diethylamine, diphenylamine, and the like. The alcohol includes, for example, methanol, ethanol, and the like.

In addition, sometimes the strength of $SiO_2$ itself has been enhanced by hydrogen bonding of hydroxyl groups themselves on $SiO_2$. In this case, if all the active hydrogens of hydroxyl groups on the surface are substituted with various substituents, decrease of particle strength and the like are caused in some cases. Accordingly, it is not necessary to substitute all the active hydrogens of hydroxyl groups on the surface of $SiO_2$, and the substitution percentage of hydroxyl groups on the surface can be appropriately decided. A method for changing the substitution percentage of hydroxyl groups on the surface is not particularly limited. The method includes, for example, a method of changing the amount of a compound used for the contact.

$SiO_2$ is preferably dried to remove water substantially, and is dried preferably by heat treatment. The heat treatment is carried out for $SiO_2$, the moisture of which cannot be visually confirmed, generally at a temperature of 100 to 1,500° C., preferably at a temperature of 100 to 1,000° C., and more preferably at a temperature of 200 to 800° C. Heating time ranges preferably from 10 minutes to 50 hours, and more preferably from 1 hour to 30 hours. A method for heat drying includes a method of drying by flowing a dry inert gas (for example, nitrogen, argon or the like) at a constant flow rate while heating, a method of heating under reduced pressure, and the like.

Component (B) is formed by contacting component (a), component (b), component (c), and component (d). The contact order of component (a), component (b), component (c), and component (d) includes the following orders.

<1> an order which comprises (i) contacting the compound (a) with the compound (b) to produce a first contact product, (ii) contacting the first contact product with the compound (c) to produce a second contact product, and (iii) contacting the second contact product with the particle (d);

<2> an order which comprises (i) contacting the compound (a) with the compound (b) to produce a first contact product, (ii) contacting the first contact product with the particle (d) to produce a second contact product, and (iii) contacting the second contact product with the compound (c);

<3> an order which comprises (i) contacting the compound (a) with the compound (c) to produce a first contact product, (ii) contacting the first contact product with the compound (b) to produce a second contact product, and (iii) contacting the second contact product with the particle (d);

<4> an order which comprises (i) contacting the compound (a) with the compound (c) to produce a first contact product, (ii) contacting the first contact product with the particle (d) to produce a second contact product, and (iii) contacting the second contact product with the compound (b);

<5> an order which comprises (i) contacting the compound (a) with the particle (d) to produce a first contact product, (ii) contacting the first contact product with the compound (b) to produce a second contact product, and (iii) contacting the second contact product with the compound (c);

<6> an order which comprises (i) contacting the compound (a) with the particle (d) to produce a first contact product, (ii) contacting the first contact product with the compound (c) to produce a second contact product, and (iii) contacting the second contact product with the compound (b);

<7> an order which comprises (i) contacting the compound (b) with the compound (c) to produce a first contact product, (ii) contacting the first contact product with the compound (a) to produce a second contact product, and (iii) contacting the second contact product with the particle (d);

<8> an order which comprises (i) contacting the compound (b) with the compound (c) to produce a first contact product, (ii) contacting the first contact product with the particle (d) to produce a second contact product, and (iii) contacting the second contact product with the compound (a);

<9> an order which comprises (i) contacting the compound (b) with the particle (d) to produce a first contact product, (ii) contacting the first contact product with the compound (a) to produce a second contact product, and (iii) contacting the second contact product with the compound (c);

<10> an order which comprises (i) contacting the compound (b) with the particle (d) to produce a first contact product, (ii) contacting the first contact product with the compound (c) to produce a second contact product, and (iii) contacting the second contact product with the compound (a);

<11> an order which comprises (i) contacting the compound (c) with the particle (d) to produce a first contact product, (ii) contacting the first contact product with the compound (a) to produce a second contact product, and (iii) contacting the second contact product with the compound (b); and <12> an order which comprises (i) contacting the compound (c) with the particle (d) to produce a first contact product, (ii) contacting the first contact product with the compound (b) to produce a second contact product, and (iii) contacting the second contact product with the compound (a).

Contact of component (a), component (b), component (c), and component (d) is preferably carried out under inert gas atmosphere. Contact temperature ranges generally from −100 to +300° C., and preferably from −80 to +200° C. Contact time ranges generally from 1 minute to 200 hours, and preferably from 10 minutes to 100 hours. In addition, a solvent may be used for contact, or these components may be directly contacted without using a solvent.

When a solvent is used, there are used those which do not react with component (a), component (b), component (c) and component (d), and contact products of them. However, when each component is contacted stepwise as mentioned above, even if a solvent reacts with a component at a stage, if the solvent does not react with each component at another stage, the solvent can be used at the other stage. That is, solvents at respective stages may be same as or different from each other. The solvent includes, for example, a nonpolar solvent and a polar solvent.

The nonpolar solvent includes, for example, a hydrocarbon solvent, and the like. The hydrocarbon solvent includes, for example, an aliphatic hydrocarbon solvent, an aromatic hydrocarbon solvent, and the like. The aliphatic hydrocarbon solvent includes, for example, butane, pentane, hexane, heptane, octane, 2,2,4-trimethylpentane, cyclohexane, and the like. The aromatic hydrocarbon solvent includes, for example, benzene, toluene, xylene, and the like.

The polar solvent includes, for example, a halide solvent, an ether type solvent, an alcohol type solvent, a phenol type solvent, a carbonyl type solvent, a phosphoric acid derivative, a nitrile type solvent, a nitro compound, an amine type solvent, a sulfur compound, and the like. The halide solvent includes, for example, dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene, o-dichlorobenzene, and the like. The ether type solvent includes, for example, dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran, tetrahydropyran, and the like. The alcohol type solvent includes, for example, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, glycerine, and the like. The phenol type solvent includes, for example, phenol, p-cresol, and the like. The carbonyl type solvent includes, for example, acetone, methyl ethyl ketone, cyclohexanone, acetic anhydride, ethyl acetate, butyl acetate, ethylene carbonate, propylene carbonate, N,N-dimethylformamide, N,N-dimethylacetamide, N-methyl-2-pyrrolidone, and the like. The phosphoric acid derivative includes, for example, hexamethylphosphoric triamide, triethyl phosphate, and the like. The nitrile type solvent includes, for example, acetonitrile, propionitrile, succinonitrile, benzonitrile, and the like. The nitro compound includes, for example, nitromethane, nitrobenzene, and the like. The amine type solvent includes, for example, ethylene diamine, pyridine, piperidine, morpholine, and the like. The sulfur compound includes, for example, dimethylsulfoxide, sulfolane, and the like.

In each of the above methods <1>, <3>, and <7>, a solvent (hereinafter, sometimes referred to as "solvent (s1)") for producing the contact product (hereinafter, sometimes referred to as "component (e)") formed by contacting component (a), component (b), and component (c), is preferably the above aliphatic hydrocarbon solvent, aromatic hydrocarbon solvent, or ether type solvent.

In addition, a solvent (hereinafter, sometimes referred to as "solvent (s2)") for contacting component (e) and component (d) is preferably a polar solvent, and more preferably a solvent having the $E_r^N$ value as an index indicating the polarity of a solvent (C. Reichardt, "Solvents and Solvents Effects in Organic Chemistry", 2nd ed., VCH Verlag (1988)), which satisfies the range, $0.8 \geq E_r^N \geq 0.1$.

Such a polar solvent includes, for example, dichloromethane, dichlorodifluoromethane, chloroform, 1,2-dichloroethane, 1,2-dibromoethane, 1,1,2-trichloro-1,2,2-trifluoroethane, tetrachloroethylene, chlorobenzene, bromobenzene, o-dichlorobenzene, dimethyl ether, diethyl ether, diisopropyl ether, di-n-butyl ether, methyl-tert-butyl ether, anisole, 1,4-dioxane, 1,2-dimethoxyethane, bis(2- methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, acetone, methyl ethyl ketone, cyclohexanone, acetic anhydride, ethyl acetate, butyl acetate, ethylene carbonate, propylene carbonate, N,N-dimethylformamide, N,N-dimethylacetamide, N-methyl-2-pyrrolidone, hexamethylphosphoric triamide, triethyl phosphate, acetonitrile, propionitrile, succinonitrile, benzonitrile, nitromethane, nitrobenzene, ethylene diamine, pyridine, piperidine, morpholine, dimethylsulfoxide, sulfolane, and the like.

The solvent (s2) is further preferably dimethyl ether, diethyl ether, diisopropyl ether, di-n-butyl ether, methyl-tert-butyl ether, anisole, 1,4-dioxane, 1,2-dimethoxyethane, bis (2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, or triethylene glycol, particularly preferably di-n-butyl ether, methyl-tert-butyl ether, 1,4-dioxane, tetrahydrofuran, methanol, ethanol, 1-propanol, 2-propanol, 1-butanol, 2-butanol, 2-methyl-1-propanol, 3-methyl-1-butanol, or cyclohexanol, and most preferably tetrahydrofuran, methanol, ethanol, 1-propanol, or 2-propanol.

As the above solvent (s2), there can be used also a mixed solvent of such a polar solvent and a hydrocarbon solvent. As the hydrocarbon solvent, there can be used the compounds cited as examples of the above aliphatic hydrocarbon solvent and aromatic hydrocarbon solvent. The mixed solvent of a polar solvent and a hydrocarbon solvent includes, for example, a mixed solvent of hexane and methanol, a mixed solvent of hexane and ethanol, a mixed solvent of hexane and 1-propanol, a mixed solvent of hexane and 2-propanol, a mixed solvent of heptane and methanol, a mixed solvent of heptane and ethanol, a mixed solvent of heptane and 1-propanol, a mixed solvent of heptane and 2-propanol, a mixed solvent of toluene and methanol, a mixed solvent of toluene and ethanol, a mixed solvent of toluene and 1-propanol, a mixed solvent of toluene and 2-propanol, a mixed solvent of xylene and methanol, a mixed solvent of xylene and ethanol, a mixed solvent of xylene and 1-propanol, a mixed solvent of xylene and 2-propanol, and the like. It is preferably a mixed solvent of hexane and methanol, a mixed solvent of hexane and ethanol, a mixed solvent of heptane and methanol, a mixed solvent of heptane and ethanol, a mixed solvent of toluene and methanol, a mixed solvent of toluene and ethanol, a mixed solvent of xylene and methanol, a mixed solvent of xylene and ethanol. It is more preferably a mixed solvent of hexane and methanol, a mixed solvent of hexane and ethanol, a mixed solvent of toluene and methanol, a mixed solvent of toluene and ethanol. It is most preferably a mixed solvent of toluene and ethanol. In addition, the proportion of ethanol in the mixed solvent of toluene and ethanol ranges preferably from 10 to 50 volume %, and more preferably from 15 to 30 volume %.

In addition, in each of the above methods <1>, <3>, and <7>, when a hydrocarbon solvent is used both as the solvent (s1) and as the solvent (s2), the time from contacting of component (a), component (b), and component (c) to contacting of the resultant component (e) and component (d) is preferably shorter. The time ranges preferably from 0 to 5 hours, more preferably from 0 to 3 hours, and most preferably from 0 to 1 hour. In addition, the temperature at the time of contacting component (e) with component (d) ranges generally from −100° C. to +40° C., preferably from −20° C. to +20° C., most preferably −10° C. to +10° C.

In each of the above methods <2>, <4>, <5>, <6>, <8>, <9>, <10>, <11>, and <12>, the solvent used therein is preferably a nonpolar solvent.

With regard to the amounts of the above components (a), (b), and (c) used, assuming that the molar ratio of the amounts of components (a), (b), and (c) used for contacting, (a):(b):(c) is 1:y:z, it is preferable to use the components so that y and z satisfy the following formulas (IV), (V), and (VI) from the viewpoint of obtaining an olefin polymer having a higher molecular weight and the viewpoint of high polymerization activity.

$$|2-y-2z| \leq 1 \quad \text{(IV)}$$

$$z \geq -2.5y+2.48 \quad \text{(V)}$$

$$y < 1 \quad \text{(VI)}$$

In the above formulas (IV) to (VI), y and z stand for a number larger than 0.

The y ranges preferably from 0.5 to 0.99, more preferably from 0.55 to 0.95, further more preferably from 0.6 to 0.9, and most preferably from 0.7 to 0.8.

The amounts of component (a) and component (b) used are such amounts that the amount of the metal atom derived from component (a) contained in component (B) is preferably not less than 0.1 mmol, and more preferably 0.5 to 20 mmol per g of component (B).

In order to promote the reaction, a heating step at a higher temperature may be added after contacting as mentioned above. In the heating step, preferably a solvent having a high boiling temperature is used in order to obtain a higher temperature, or, at the time of conducting the heating step, the solvent used for contacting may be replaced with another solvent having a higher boiling point.

In component (B), at least one component of component (a), component (b), component (c), and component (d), which are starting materials, may remain as unreacted material, but preferably the unreacted material is removed by carrying out washing treatment. A solvent in conducting the washing treatment may be the same as or different from a solvent used for conducting contact. Such washing treatment is preferably carried out under inert gas atmosphere. Contacting temperature ranges generally from −100 to +300° C., and preferably from −80 to +200° C. Contacting time ranges generally from 1 minute to 200 hours, and preferably from 10 minutes to 100 hours.

In addition, after such contacting and washing treatment, it is preferable to vaporize a solvent from the product and then conduct drying at a temperature of not less than 0° C. for 1 hour to 24 hours under reduced pressure. The drying is conducted more preferably at a temperature of 0° C. to 200° C. for 1 hour to 24 hours, further more preferably at a temperature of 10° C. to 200° C. for 1 hour to 24 hours, particularly preferably at a temperature of 10° C. to 160° C. for 2 hours to 18 hours, and most preferably at a temperature of 15° C. to 160° C. for 4 hours to 18 hours.

An organic aluminium compound as component (C) includes a trialkyl aluminium, a dialkyl aluminium chloride, an alkyl aluminium dichloride, a dialkyl aluminium hydride, an alkyl(dialkoxy)aluminium, a dialkyl(alkoxy)aluminium, an alkyl(diaryloxy)aluminium, a dialkyl(aryloxy)aluminium, and the like.

The trialkyl aluminium includes trimethyl aluminium, triethyl aluminium, tri-n-propyl aluminium, tri-n-butyl aluminium, triisobutyl aluminium, tri-n-hexyl aluminium, tri-n-octyl aluminium, and the like.

The dialkyl aluminium chloride includes dimethyl aluminium chloride, diethyl aluminium chloride, di-n-propyl aluminium chloride, di-n-butyl aluminium chloride, diisobutyl aluminium chloride, di-n-hexyl aluminium chloride, and the like.

The alkyl aluminium dichloride includes methyl aluminium dichloride, ethyl aluminium dichloride, n-propyl aluminium dichloride, n-butyl aluminium dichloride, isobutyl aluminium dichloride, n-hexyl aluminium dichloride, and the like.

The dialkyl aluminium hydride includes dimethyl aluminium hydride, diethyl aluminium hydride, di-n-propyl aluminium hydride, di-n-butyl aluminium hydride, diisobutyl aluminium hydride, di-n-hexyl aluminium hydride, and the like.

The alkyl(dialkoxy)aluminium includes methyl(dimethoxy)aluminium, methyl(diethoxy)aluminium, methyl(di-tert-butoxy)aluminium, and the like.

The dialkyl(alkoxy)aluminium includes dimethyl(methoxy)aluminium, dimethyl(ethoxy)aluminium, dimethyl(tert-butoxy)aluminium, and the like.

The alkyl(diaryloxy)aluminium includes methyl(diphenoxy)aluminium, methyl bis(2,6-diisopropylphenoxy)aluminium, methyl bis(2,6-diphenylphenoxy)aluminium, and the like.

The dialkyl(aryloxy)aluminium includes dimethyl(phenoxy)aluminium, dimethyl(2,6-diisopropylphenoxy)aluminium, dimethyl(2,6-diphenylphenoxy)aluminium, and the like.

These organic aluminium compounds may be used singly or in a combination of at least two kinds.

The organic aluminium compound is preferably a trialkyl aluminium, more preferably trimethyl aluminium, triethyl aluminium, tri-n-butyl aluminium, triisobutyl aluminium, tri-n-hexyl aluminium, or tri-n-octyl aluminium, and further more preferably triisobutyl aluminium, or tri-n-octyl aluminium.

The number of moles of the aluminium atom of an organic aluminium compound per mole of component (A) ranges preferably from 0.1 to 1,000, more preferably from 0.5 to 500, and further more preferably from 1 to 100.

In addition, in preparation of the polymerization catalyst, an electron-donating compound (hereinafter, sometimes referred to as "component (D)") may be contacted in addition to component (A), component (B), and component (C). With regard to the amount of component (D) used, the number of moles of component (D) per mole of component (A) ranges preferably from 0.01 to 100, more preferably from 0.1 to 50, and further more preferably from 0.25 to 5.

The component (D) includes triethylamine, and tri-n-octylamine.

Contacting of component (A), component (B), and component (C), and, as needed, component (D) is preferably carried out under inert gas atmosphere. Contacting temperature ranges generally from −100 to +300° C., and preferably from −80 to +200° C. Contacting time ranges generally from 1 minute to 200 hours, and preferably from 30 minutes to 100 hours. In addition, contacting may be carried out in a polymerization reaction vessel by charging each component separately into the polymerization reaction vessel.

A method for producing the ethylene-α-olefin copolymer of the present invention includes gas phase polymerization method, slurry polymerization method, bulk polymerization method, and the like. It is preferably gas phase polymerization method, and more preferably continuous gas phase polymerization method. A gas phase polymerization reaction apparatus used for the polymerization method is generally an apparatus having a fluidized bed type reaction vessel, and preferably an apparatus having a fluidized bed type reaction vessel with an enlarged part. An agitating blade may be provided in the reaction vessel.

As a method for feeding the polymerization catalyst or each catalyst component in a polymerization reaction vessel, there can be generally used a method of feeding it in the state of no water content by use of an inert gas such as nitrogen or argon, hydrogen, ethylene, or the like, or a method of feeding each component dissolved in a solvent or diluted with a solvent in the state of solution or slurry.

In the case of conducting gas phase polymerization of ethylene and an α-olefin, polymerization temperature is generally less than the melting temperature of an ethylene-α-olefin copolymer, preferably from 0 to 150° C., and more preferably from 30 to 100° C. Into a polymerization reaction vessel, there may be introduced an inert gas and hydrogen as a molecular weight modifier. Also, there may be introduced component (D).

An α-olefin having 3 to 20 carbon atoms used for the polymerization includes propylene, 1-butene, 1-pentene, 1-hexene, 1-heptene, 1-octene, 1-nonene, 1-decene, 1-dodecene, 4-methyl-1-pentene, 4-methyl-1-hexene, and the like. These may be used singly or may be used in combination of two or more kinds. Preferably, 1-butene, 1-hexene, 4-methyl-1-pentene, or 1-octene is used. A combination of ethylene and an α-olefin having 3 to 20 carbon atoms includes a combination of ethylene and 1-butene, a combination of ethylene and 1-hexene, a combination of ethylene and 4-methyl-1-pentene, a combination of ethylene and 1-octene, a combination of ethylene and 1-butene and 1-hexene, a combination of ethylene and 1-butene and 4-methyl-1-pentene, a combination of ethylene and 1-butene and 1-octene, a combination of ethylene and 1-hexene and 1-octene, and the like, preferably a combination of ethylene and 1-butene, a combination of ethylene and 1-hexene, a combination of ethylene and 4-methyl-1-pentene, a combination of ethylene and 1-butene and 1-hexene, a combination of ethylene and 1-butene and 1-octene, a combination of ethylene and 1-hexene and 1-octene.

In addition, in the copolymerization of ethylene and an α-olefin, as needed, another monomer may be introduced into a polymerization reaction vessel, and the other monomer may be used in combination with the olefin in the range where effects of the present invention are not impaired. The other monomer includes, for example, a diolefin, a cyclic olefin, an alkenyl aromatic hydrocarbon, an α,β-unsaturated carboxylic acid, a metal salt of α,β-unsaturated carboxylic acid, an α,β-unsaturated carboxylic acid alkyl ester, an unsaturated dicarboxylic acid, a vinyl ester, an unsaturated carboxylic acid glycidyl ester, and the like.

The diolefin includes, for example, 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, norbornadiene, 5-methylene-2-norbornene, 1,5-cyclooctadiene, 5,8-endomethylenehexahydronaphthalene, 1,3-butadiene, isoprene, 1,3-hexadiene, 1,3-octadiene, 1,3-cyclooctadiene, 1,3-cyclohexadiene, and the like.

The cyclic olefin includes, for example, norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyl tetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cynonorbornene, 8-methoxycarbonyltetracyclododecene, 8-methyl-8-tetracyclododecene, 8-cyanotetracyclododecene, and the like.

The alkenyl aromatic hydrocarbon includes, for example, an alkenylbenzene such as styrene, 2-phenylpropylene, 2-phenylbutene, or 3-phenylpropylene; an alkylstyrene such as p-methylstyrene, m-methylstyrene, o-methylstyrene, p-ethylstyrene, methylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene, or p-sec-butylstyrene; a bisalkenylbenzene such as divinylbenzene; an alkenylnaphthalene such as 1-vinylnaphthalene; and the like.

The $\alpha,\beta$-unsaturated carboxylic acid includes, for example, acrylic acid, methacrylic acid, fumaric acid, maleic anhydride, itaconic acid, itaconic anhydride, bicyclo(2,2,1)-5-heptene-2,3-dicarboxylic acid, and the like.

The metal salt of $\alpha,\beta$-unsaturated carboxylic acid includes, for example, sodium salt, potassium salt, lithium salt, zinc salt, magnesium salt, calcium salt, and the like of the above $\alpha,\beta$-unsaturated carboxylic acids.

The $\alpha,\beta$-unsaturated carboxylic acid alkyl ester includes, for example, methyl acrylate, ethyl acrylate, n-propyl acrylate, isopropyl acrylate, t-butyl acrylate, 2-ethylhexyl acrylate, methyl methacrylate, ethyl methacrylate, n-propyl methacrylate, and the like.

The unsaturated dicarboxylic acid includes, for example, maleic acid, itaconic acid, and the like. The vinyl ester includes, for example, vinyl acetate, vinyl propionate, vinyl caproate, vinyl caprate, vinyl laurate, vinyl stearate, vinyl trifluoroacetate, and the like.

The unsaturated carboxylic acid glycidyl ester includes, for example, glycidyl acrylate, glycidyl methacrylate, itaconic acid monoglycidyl ester, and the like.

In a method for producing the ethylene-$\alpha$-olefin copolymer of the present invention, an olefin may be polymerized by use of a prepolymerization solid component obtained by polymerizing (hereinafter, referred to as prepolymerization) a small amount of an olefin by using component (A), component (B), and component (C), and, as needed, component (D).

The olefin used for prepolymerization includes ethylene, propylene, 1-butene, 1-pentene, hexene, 1-octene, 4-methyl-1-pentene, cyclopentene, cyclohexene, and the like. These may be used singly or may be used in combination of two or more kinds. Preferably ethylene only or a combination of ethylene and an $\alpha$-olefin, and more preferably ethylene only or a combination of ethylene and at least one $\alpha$-olefin selected from 1-butene, 1-hexene, and 1-octene is used.

The content of the polymer produced by prepolymerization in the prepolymerization solid component ranges preferably from 0.01 to 1,000 g, more preferably from 0.05 to 500 g, further more preferably from 0.1 to 200 g per g of component (B).

Prepolymerization method may be continuous polymerization method or batch polymerization method, for example, batch type slurry polymerization method, continuous slurry polymerization method, or continuous gas phase polymerization method. As a method for charging component (A), component (B), and component (C), and, as needed, component (D) in a polymerization reaction vessel for conducting prepolymerization, there can be generally used a method of charging them in the state of no water content by use of an inert gas such as nitrogen or argon, hydrogen, ethylene, or the like, or a method of charging each component dissolved in a solvent or diluted with a solvent in the state of solution or slurry.

In the case of conducting prepolymerization by slurry polymerization method, as the solvent, there is generally used a saturated aliphatic hydrocarbon compound, and it includes, for example, propane, n-butane, isobutane, n-pentane, isopentane, n-hexane, cyclohexane, heptane, and the like. These are used singly or in combination of two or more kinds. As the saturated aliphatic hydrocarbon compound, those which have a boiling point of not more than 100° C. at normal pressures, are preferable, those which have a boiling point of not more than 90° C. at normal pressures, are more preferable, and propane, n-butane, isobutane, n-pentane, isopentane, n-hexane, and cyclohexane are further more preferable.

In addition, as the slurry concentration, the amount of component (B) per liter of a solvent ranges generally from 0.1 to 600 g, and preferably from 0.5 to 300 g. Prepolymerization temperature ranges generally from −20 to +100° C., and preferably from 0 to 80° C. In addition, the partial pressure of olefins in the gas phase portion during prepolymerization ranges generally from 0.001 to 2 MPa, and preferably from 0.01 to 1 MPa. Prepolymerization time ranges generally from 2 minutes to 15 hours.

As a method for feeding the prepolymerization solid catalyst component produced by prepolymerization in a polymerization reaction vessel, there can be generally used a method of feeding it in the state of no water content by use of an inert gas such as nitrogen or argon, hydrogen, ethylene, or the like, or a method of feeding each component dissolved in a solvent or diluted with a solvent in the state of solution or slurry.

The ethylene-$\alpha$-olefin copolymer of the present invention may contain a publicly-known additive, as needed. The additive includes, for example, antioxidant, weathering agent, lubricant, antiblocking agent, antistatic agent, anti-fogging agent, anti-dropping agent, pigment, filler, and the like.

In addition, a thermoplastic resin other than the ethylene-$\alpha$-olefin copolymer of the present invention may be blended with the ethylene-$\alpha$-olefin copolymer of the present invention to produce a thermoplastic resin composition. The other thermoplastic resin includes, for example, crystalline thermoplastic resins such as a polyolefin, a polyamide, a polyester, and a polyacetal; noncrystalline thermoplastic resins such as a polystyrene, an acrylonitrile.butadiene-styrene copolymer (ABS), a polycarbonate, a polyphenylene oxide, and a polyacrylate; a polyvinyl chloride, and the like.

The polyolefin includes, for example, polyethylene, polypropylene, polybutene, poly4-methyl-1-pentene, poly3-methyl-1-butene, polyhexene, and the like.

The polyamide includes, for example, aliphatic amides such as nylon 6, nylon 66, nylon 10, nylon 12, and nylon 46; aromatic polyamides produced from aromatic dicarboxylic acids and aliphatic diamines; and the like.

The polyester includes, for example, aromatic polyesters such as polyethylene terephthalate, polyethylene naphthalate, and polybutylene terephthalate; polycaprolactone, polyhydroxybutyrate, and the like.

The polyacetal includes, for example, polyformaldehyde (polyoxymethylene), polyacetaldehyde, polypropionaldehyde, polybutyraldehyde, and the like.

The polystyrene may be homopolymer of styrene, or a copolymer of styrene and acrylonitrile, methyl methacrylate, or $\alpha$-methylstyrene.

As an ABS, there is preferably used the ABS containing 20 to 35 mole % of a constituent unit derived from acrylonitrile, 20 to 30 mole % of a constituent unit derived from butadiene, and 40 to 60 mole % of a constituent unit derived from styrene.

The polycarbonate includes, for example, polymers obtained from bis(4-hydroxyphenyl)methane, 1,1-bis(4-hydroxyphenyl)ethane, 2,2-bis(4-hydroxyphenyl)propane, 2,2-bis(4-hydroxyphenyl)butane, and the like.

The polyphenylene oxide includes, for example, poly(2,6-dimethyl-1,4-phenylene oxide), and the like.

The polyacrylate includes, for example, polymethyl methacrylate, polybutyl acrylate, and the like.

In molding of the ethylene-α-olefin copolymer of the present invention, there is used a publicly-known molding method, for example, extrusion molding method such as blown film molding method, flat die film molding method, or lamination film molding method; injection molding method, compression molding method, or the like, and preferably extrusion molding method.

The ethylene-α-olefin copolymer of the present invention is molded into various shapes, which are used. The shapes of molded articles are not particularly limited, and the copolymer is used for film, sheet, vessels (bottles, trays, or the like), and the like. The molded articles are preferably used for various uses such as food packaging material, medicine packaging material, electronic part packaging material used for packaging of semiconductor products and the like, surface protecting material, and the like.

EXAMPLES

Hereinafter, the present invention is illustrated by way of an Example.

Physical properties in the Example were measured in accordance with the following methods.

(1) Density (d, Unit: Kg/m$^3$)

Density was measured in accordance with the method as stipulated in A method of JIS K7112-1980. In addition, the sample was subjected to the annealing as stated in JIS K6760-1995.

(2) Number of Short Chain Branches ($N_{SCB}$, Unit: 1/1000C)

The number of short chain branches per 1,000 carbon atoms ($N_{SCB}$) was obtained by using calibration curve from the absorption characteristics of ethylene and an α-olefin, by use of an infrared spectroscopic photometer (FT-IR7300 manufactured by JASCO Corporation). This $N_{SCB}$ value indicates the content of a monomer unit derived from an α-olefin in a copolymer of ethylene and an α-olefin.

(3) Melt Flow Rate (MFR, Unit: g/10 min)

Melt flow rate was measured by A method under the conditions of 21.18 N load and 190° C. temperature in the method as stipulated in JIS K7210-1995.

(4) Melt Flow Rate Ratio (MFRR)

This ratio was obtained by measuring a melt flow rate (H-MFR) measured under the conditions of 211.82 N test load and 190° C. measurement temperature in the method as stipulated in JIS K7210-1995 and a melt flow rate (MFR) measured under the conditions of 21.18 N load and 190° C. temperature in the method as stipulated in JIS K7210-1995, and then dividing H-MFR by MFR.

(5) Swell Ratio (SR)

The swell ratio is a value ($D/D_0$) obtained by extruding a strand of the ethylene-α-olefin copolymer at a length of about 15 to 20 mm from an orifice under the conditions of 190° C. temperature and 21.18 N load in measurement of melt flow rate in (3) and cooling it in the air to obtain a solid strand, then measuring the diameter D (unit: mm) of the strand at the position of about 5 mm from the extruded upstream end of the strand, and dividing the diameter D by the diameter of the orifice, 2.095 mm ($D_0$).

(6) Molecular Weight Distribution (Mw/Mn)

Weight average molecular weight (Mw), and number average molecular weight (Mn) were measured by use of gel permeation chromatograph (GPC) method under the following conditions (i) to (viii), and Mw/Mn was calculated. As the base line on chromatogram, there was used a straight line produced by connecting the point of a stable horizontal area sufficiently shorter in retention time than appearance of a sample elution peak and the point of a stable horizontal area sufficiently longer in retention time than observation of a solvent elution peak.

(i) Apparatus: Waters 150C manufactured by Waters Co., Ltd.
(ii) Separation column: TOSOH TSK gel GMH6-HT
(iii) Measurement temperature: 140° C.
(iv) Carrier: ortho-dichlorobenzene
(v) Flow rate: 1.0 mL/min
(vi) Poured amount: 500 µL
(vii) Detector: differential refractometer
(viii) Molecular weight standard substance: standard polystyrene (7) Number of Long Chain Branches ($N_{LCB}$, Unit: 1/1000C)

This number was obtained by measuring carbon nuclear magnetic resonance ($^{13}$C-NMR) spectrum under the following measurement conditions by carbon nuclear magnetic resonance method and conducting the following calculation method.

<Measurement Conditions>
Apparatus: AVANCE 600 manufactured by Bruker Corporation
Measurement solvent: a mixed liquid of 1,2-dichlorobenzene/1,2-dichlorobenzene-d4=75/25 (volume ratio)
Measurement temperature: 130° C.
Measurement method: proton-decoupling method
Pulse width: 45 degrees
Pulse repeating time: 4 seconds
Measurement reference: trimethylsilane
Window function: negative exponential function <Calculation Method>
Assuming that the sum of areas of all peaks observed at 5 to 50 ppm is 1000, the area of a peak having its peak top approximately at 38.22 to 38.27 ppm was calculated. The area of the peak was the area of signals in the range of from chemical shift of a valley with the adjacent peak at high magnetic field side to chemical shift of a valley with the adjacent peak at low magnetic field side. In this connection, in measurement of an ethylene-α-olefin copolymer under the present conditions, the position of the top of a peak derived from methine carbon having a branch of 5 carbon atoms bonded thereto was at 38.21 ppm.

(8) Activation Energy of Flow (Ea, Unit: kJ/mol)

By use of a viscoelasticity measuring apparatus (Rheometrics Mechanical Spectrometer RMS-800 manufactured by Rheometrics Co.), there were measured melting complex viscosity-angular frequency curves at 130° C., 150° C., 170° C., and 190° C. under the measurement conditions as mentioned below. Next, from the resultant melting complex viscosity-angular frequency curves, the master curve of melting complex viscosity-angular frequency curve at 190° C. was prepared, and activation energy (Ea) was calculated, by use of the calculation software, Rhios V.4.4.4 manufactured by Rheometrics Co.

<Measurement Conditions>
Geometry: parallel plates
Plate diameter: 25 mm
Distance between plates: 1.5 to 2 mm
Strain: 5%
Angular frequency: 0.1 to 100 rad/sec
Measurement atmosphere: nitrogen (9) Characteristic Relaxation Time (τ) (sec)

By use of a viscoelasticity measuring apparatus (Rheometrics Mechanical Spectrometer RMS-800 manufactured by Rheometrics Co.), there were measured melting complex viscosity-angular frequency curves at 130° C., 150° C., 170° C., and 190° C. under the measurement conditions as mentioned below. Next, from the resultant melting complex viscosity-angular frequency curves, the master curve of melting complex viscosity-angular frequency curve at 190° C. was prepared, and characteristic relaxation time (τ) was calculated, by use of the calculation software, Rhios V.4.4.4 manufactured by Rheometrics Co.

<Measurement Conditions>
Geometry: parallel plates
Plate diameter: 25 mm
Distance between plates: 1.5 to 2 mm
Strain: 5%
Angular frequency: 0.1 to 100 rad/sec
Measurement atmosphere: nitrogen

(10) g*

In accordance with the above-mentioned formula (I), g* was calculated.

In this connection, [η] was calculated in accordance with formula (I-I), after relative viscosity (ηrel) of the ethylene-α-olefin copolymer was calculated by dissolving 100 mg of the ethylene-α-olefin copolymer at 135° C. in 100 ml of tetralin solution containing 0.5 weight % of butylhydroxytoluene (BHT) as a heat deterioration inhibitor to prepare a sample solution, measuring fall times of the sample solution and a blank solution consisting of a tetralin solution containing 0.5 weight % of BHT only as a heat deterioration inhibitor by use of Ubbelohde type viscometer, and using the resultant fall times. In accordance with formula (I-II), [η]$_{GPC}$ was calculated based on viscosity average molecular weight Mv calculated by the formula (I-IV) from a measured value of molecular weight distribution of the ethylene-α-olefin copolymer in (6). In accordance with the formula (I-III), g$_{SCB}$* was calculated after the measurement of the number of short chain branches in the ethylene-α-olefin copolymer in (2).

(11) Stretch Viscosity Measurement of a Molten Resin

By using a stretch viscosity measuring apparatus (ARES available from TA Instruments Corp.), stretch viscosity-time curves of a molten resin at a temperature of 130° C. at Hencky rates of 0.1s$^{-1}$ and 1 s$^{-1}$ were measured. As a test piece for the measurement, a sheet having a size of 18 mm×10 mm and a thickness of 0.7 mm obtained by a press molding.

(12) Melt Tension (MT, Unit: cN)

By using a melt tension tester available from Toyo Seiki Seisakusyo Corp., an ethylene-α-olefin copolymer was molten-extruded from an orifice having a diameter of 2.095 mm and a length of 8 mm at a temperature of 190° C. and at an extrusion rate of 0.32 g/minute. The extruded molten ethylene-α-olefin copolymer was drawn in the form of filament at a take-off lift speed of 6.3 (m/minute)/minute with a draw roll. Tension at the time of drawing was measured. Melt tension represents a maximum tension between a drawing start and a cut of the ethylene-α-olefin copolymer in the form of filament.

(13) Cold Xylene Soluble Fraction (CXS, Unit: %)

Cold xylene soluble fraction was determined as a value obtained by correcting an amount of soluble portions by the following formula, in which the soluble portions were took out by dissolving about 5 g of a polymer sample in one liter of a boiling xylene containing an anti-oxidant, cooling it up to room temperature over about 2 hours, further leaving it to stand at 25° C. for 20 hours to precipitate insoluble portions, and removing a solvent from a filtrate portion filtered/recovered to take out soluble portions.

Cold xylene soluble fraction=[[soluble portions (g)× (1/an amount of a filtrate (liter))]/total amount of polymer sample (5 g)]×100 (weight %)

(14) Number of Melting Peaks in Melting Curve

An ethylene-α-olefin copolymer was pressed at a pressure of 10 MPa for 5 minutes with a thermal pressing machine at 150° C., and then was cooled for 5 minutes with a cold pressing machine at 30° C. to form a sheet having a thickness of about 100 μm, and then about 10 mg of a sample was cut from the sheet to tightly enclose the sample cut in an aluminum pan. Then, a melting curve was obtained in the following measurement (4) by using a differential scanning calorimeter (e.g. DSC-7 type available from Perkin-Elmer Corp.), by (1) retaining the aluminum pan tightly enclosing the sample at 150° C. for 5 minutes, (2) decreasing the temperature from 150° C. to 20° C. at a rate of 5° C./minute, (3) retaining the temperature at 20° C. for 2 minutes, and (4) increasing the temperature from 20° C. to 150° C. at a rate of 5° C./minute. From the melting curve obtained, the number of peaks observed from 25° C. to a melt end temperature (a temperature at which the melting curve is returned to a base line of a high temperature side) were determined.

Example 1

(1) Preparation of Solid Catalyst Component (B)

Into a reaction vessel substituted with nitrogen and equipped with a stirrer, 2.8 kg of heat-treated silica (Sylopol 948 manufactured by Davison Co.; 50% volume average particle diameter=55 μm; pore volume=1.67 ml/g; specific surface area=325 m$^2$/g) and 24 kg of toluene were charged and stirred at 300° C. under flow of nitrogen. After cooling the resultant mixture to 5° C., a mixed solution of 0.9 kg of 1,1,1,3,3,3-hexamethyldisilazane and 1.4 kg of toluene was added dropwise thereto over 30 minutes, while keeping the temperature of the reaction vessel at 5° C. After completion of dropping, stirring was conducted at 5° C. for 1 hour, then temperature was raised to 95° C., stirring was conducted at 95° C. for 3 hours, and filtration was conducted. The resultant solid product was washed 6 times with 20.8 kg of toluene. Thereafter, 7.1 kg of toluene was added thereto to produce a slurry, which was left at rest overnight.

Into the slurry obtained above, 1.73 kg of a hexane solution of diethyl zinc (diethyl zinc concentration: 50 weight %) and 1.02 kg of hexane were charged and stirred. Subsequently, cooling to 5° C. was conducted, and then a mixed solution of 0.78 kg of 3,4,5-trifluorophenol and 1.44 kg of toluene was added dropwise thereto over 60 minutes, while keeping the temperature of the reaction vessel at 5° C. After completion of adding, stirring was conducted at 5° C. for 1 hour, then temperature was raised to 40° C., and stirring was conducted at 40° C. for 1 hour. Thereafter, cooling to 22° C. was conducted, and 0.11 kg of H$_2$O was dropped therein for 1.5 hours, while keeping the temperature of the reaction vessel at 22° C. After completion of dropping, stirring was conducted at 22°

C. for 1.5 hour, then temperature was raised to 40° C., stirring was conducted at 40° C. for 2 hours, and furthermore temperature was raised to 80° C., and stirring was conducted at 80° C. for 2 hours. After stirring, the supernatant liquid was taken out to leave 16 L of the residue at room temperature, and 11.6 kg of toluene was charged therein and then temperature was raised to 95° C., and stirring was conducted for 4 hours. After stirring, the supernatant liquid was taken out at room temperature to obtain a solid product. The resultant solid product was washed 4 times with 20.8 kg of toluene and 3 times with 24 L of hexane. Thereafter, it was dried to obtain solid catalyst component (B).

(2) Polymerization

After drying under reduced pressure, the inside of an autoclave with a stirrer having an inner volume of 3 L substituted with argon was made vacuum, hydrogen was added therein so as to give its partial pressure of 0.001 MPa, 30 g of 1-butene as a comonomer and 720 g of butane as a polymerization solvent were charged therein, and temperature was raised to 70° C. Thereafter, ethylene as a monomer was added therein so as to give its partial pressure of 1.6 MPa and the inside of the system was made stable. As a result of gas chromatography analysis, the gas composition in the system indicated 0.035 mol % of hydrogen and 3.38 mol % of 1-butene. Therein was charged 0.9 ml of a hexane solution of triisobutyl aluminium (C), which has a concentration adjusted at 1 mol/L. Next, 0.25 ml of a toluene solution of dimethylsilylenebis(3-phenylcyclopentadienyl)zirconium dichloride (racemic/meso ratio=49.2/50.8) (A), which has a concentration adjusted at 2 µmol/ml, was charged therein, and sequentially 5.1 mg of the solid catalyst component (B) obtained in the above Example 1-(1) was charged therein. While feeding ethylene gas so as to keep the total pressure constant, polymerization was carried out for 1 hour at 70° C. As the result thereof, 35 g of an olefin polymer was obtained. Polymerization activity per hour per zirconium atom was $7.0 \times 10^7$ g/mol Zr·h.

Example 2

(1) Polymerization

After drying under reduced pressure, the inside of an autoclave with a stirrer having an inner volume of 3 L substituted with argon was made vacuum, hydrogen was added therein so as to give its partial pressure of 0.002 MPa, 100 ml of 1-hexene and 650 g of butane as a polymerization solvent were charged therein, and temperature was raised to 70° C. Thereafter, ethylene was added therein so as to give its partial pressure of 1.6 MPa and the inside of the system was made stable. As a result of gas chromatography analysis, the gas composition in the system indicated 0.09 mol % of hydrogen. Therein was charged 0.9 ml of a hexane solution of triisobutyl aluminium, which has a concentration adjusted at 1 mol/L, as an organic aluminium compound (C). Next, 1 ml of a toluene solution of dimethylsilylenebis(3-phenylcyclopentadienyl) zirconium dichloride (racemic/meso ratio=49.2/50.8) (A), which has a concentration adjusted at 1 µmol/ml, was charged therein, and sequentially 8.3 mg of the solid catalyst component (B) obtained in the above Example 1-(1) was charged therein. While continuously feeding an ethylene/hydrogen mixed gas (hydrogen=0.07 mol %) during the polymerization, polymerization was carried out for 60 minutes at 70° C. Then, butane, ethylene and hydrogen were purged to obtain 65 g of an ethylene-1-hexene copolymer. Properties of the copolymer obtained are shown at Table 1.

Example 3

(1) Polymerization

After drying under reduced pressure, the inside of an autoclave with a stirrer having an inner volume of 3 L substituted with argon was made vacuum, hydrogen was added therein so as to give its partial pressure of about 0.004 MPa, 100 ml of 1-hexene and 650 g of butane as a polymerization solvent were charged therein, and temperature was raised to 70° C. Thereafter, ethylene was added therein so as to give its partial pressure of 1.6 MPa and the inside of the system was made stable. As a result of gas chromatography analysis, the gas composition in the system indicated 0.17 mol % of hydrogen. Therein was charged 0.9 ml of a hexane solution of triisobutyl aluminium, which has a concentration adjusted at 1 mol/L, as an organic aluminium compound (C). Next, 1 ml of a toluene solution of dimethylsilylenebis(3-phenylcyclopentadienyl) zirconium dichloride (racemic/meso ratio=49.2/50.8) (A), which has a concentration adjusted at 1 µmol/ml, was charged therein, and sequentially 15.3 mg of the solid catalyst component (B) obtained in the above Example 1-(1) was charged therein. While continuously feeding an ethylene/hydrogen mixed gas (hydrogen=0.04 mol %) during the polymerization, polymerization was carried out for 60 minutes at 70° C. Then, butane, ethylene and hydrogen were purged to obtain 113 g of an ethylene-1-hexene copolymer. Properties of the copolymer obtained are shown at Table 1.

Example 4

(1) Polymerization

After drying under reduced pressure, the inside of an autoclave with a stirrer having an inner volume of 3 L substituted with argon was made vacuum, hydrogen was added therein so as to give its partial pressure of about 0.005 MPa, 100 ml of 1-hexene and 650 g of butane as a polymerization solvent were charged therein, and temperature was raised to 70° C. Thereafter, ethylene was added therein so as to give its partial pressure of 1.6 MPa and the inside of the system was made stable. As a result of gas chromatography analysis, the gas composition in the system indicated 0.21 mol % of hydrogen. Therein was charged 0.9 ml of a hexane solution of triisobutyl aluminium, which has a concentration adjusted at 1 mol/L, as an organic aluminium compound (C). Next, 1 ml of a toluene solution of dimethylsilylenebis(3-phenylcyclopentadienyl) zirconium dichloride (racemic/meso ratio=49.2/50.8) (A), which has a concentration adjusted at 1 µmol/ml, was charged therein, and sequentially 13.7 mg of the solid catalyst component (B) obtained in the above Example 1-(1) was charged therein. While continuously feeding an ethylene/hydrogen mixed gas (hydrogen=0.07 mol %) during the polymerization, polymerization was carried out for 60 minutes at 70° C. The gas composition in the system, after a polymerization completion, indicated 0.32 mol % of hydrogen. After a polymerization completion, butane, ethylene and hydrogen were purged to obtain 104 g of an ethylene-1-hexene copolymer. Properties of the copolymer obtained are shown at Table 1.

Example 5

(1) Polymerization

After drying under reduced pressure, the inside of an autoclave with a stirrer having an inner volume of 3 L substituted with argon was made vacuum, hydrogen was added therein so as to give its partial pressure of about 0.004 MPa, 100 ml of 1-hexene and 650 g of butane as a polymerization solvent were charged therein, and temperature was raised to 70° C. Thereafter, ethylene was added therein so as to give its partial pressure of 1.6 MPa and the inside of the system was made stable. As a result of gas chromatography analysis, the gas composition in the system indicated 0.24 mol % of hydrogen. Therein was charged 0.9 ml of a hexane solution of triisobutyl aluminium, which has a concentration adjusted at 1 mol/L, as an organic aluminium compound (C). Next, 1 ml of a toluene solution of dimethylsilylenebis(3-phenylcyclopentadienyl) zirconium dichloride (racemic/meso ratio=49.2/50.8) (A), which has a concentration adjusted at 1 μmol/ml, was charged therein, and sequentially 6.2 mg of the solid catalyst component (B) obtained in the above Example 1-(1) was charged therein. While continuously feeding an ethylene/hydrogen mixed gas (hydrogen=0.09 mol %) during the polymerization, polymerization was carried out for 60 minutes at 70° C. The gas composition in the system, after a polymerization completion, indicated 0.28 mol % of hydrogen. Then, butane, ethylene and hydrogen were purged to obtain 33 g of an ethylene-1-hexene copolymer. Properties of the copolymer obtained are shown at Table 1.

Example 6

(1) Polymerization

After drying under reduced pressure, the inside of an autoclave with a stirrer having an inner volume of 3 L substituted with argon was made vacuum, hydrogen was added therein so as to give its partial pressure of about 0.007 MPa, 100 ml of 1-hexene and 650 g of butane as a polymerization solvent were charged therein, and temperature was raised to 70° C. Thereafter, ethylene was added therein so as to give its partial pressure of 1.6 MPa and the inside of the system was made stable. As a result of gas chromatography analysis, the gas composition in the system indicated 0.31 mol % of hydrogen. Therein was charged 0.9 ml of a hexane solution of triisobutyl aluminium, which has a concentration adjusted at 1 mol/L, as an organic aluminium compound (C). Next, 1 ml of a toluene solution of dimethylsilylenebis(3-phenylcyclopentadienyl) zirconium dichloride (racemic/meso ratio=49.2/50.8) (A), which has a concentration adjusted at 1 μmol/ml, was charged therein, and sequentially 7.0 mg of the solid catalyst component (B) obtained in the above Example 1-(1) was charged therein. While continuously feeding an ethylene/hydrogen mixed gas (hydrogen=0.07 mol %) during the polymerization, polymerization was carried out for 60 minutes at 70° C. Then, butane, ethylene and hydrogen were purged to obtain 48 g of an ethylene-1-hexene copolymer. Properties of the copolymer obtained are shown at Table 1.

Example 7

(1) Polymerization

After drying under reduced pressure, the inside of an autoclave with a stirrer having an inner volume of 3 L substituted with argon was made vacuum, hydrogen was added therein so as to give its partial pressure of about 0.009 MPa, 100 ml of 1-hexene and 650 g of butane as a polymerization solvent were charged therein, and temperature was raised to 70° C. Thereafter, ethylene was added therein so as to give its partial pressure of 1.6 MPa and the inside of the system was made stable. As a result of gas chromatography analysis, the gas composition in the system indicated 0.42 mol % of hydrogen. Therein was charged 0.9 ml of a hexane solution of triisobutyl aluminium, which has a concentration adjusted at 1 mol/L, as an organic aluminium compound (C). Next, 1 ml of a toluene solution of dimethylsilylenebis(3-phenylcyclopentadienyl) zirconium dichloride (racemic/meso ratio=49.2/50.8) (A), which has a concentration adjusted at 1 μmol/ml, was charged therein, and sequentially 10.3 mg of the solid catalyst component (B) obtained in the above Example 1-(1) was charged therein. While continuously feeding an ethylene/hydrogen mixed gas (hydrogen=0.07 mol %) during the polymerization, polymerization was carried out for 60 minutes at 70° C. Then, butane, ethylene and hydrogen were purged to obtain 54 g of an ethylene-1-hexene copolymer. Properties of the copolymer obtained are shown at Table 1.

Example 8

(1) Polymerization

After drying under reduced pressure, the inside of an autoclave with a stirrer having an inner volume of 3 L substituted with argon was made vacuum, hydrogen was added therein so as to give its partial pressure of 0.003 MPa, 120 ml of 1-hexene and 650 g of butane as a polymerization solvent were charged therein, and temperature was raised to 70° C. Thereafter, ethylene was added therein so as to give its partial pressure of 1.6 MPa and the inside of the system was made stable. As a result of gas chromatography analysis, the gas composition in the system indicated 0.08 mol % of hydrogen. Therein was charged 0.9 ml of a hexane solution of triisobutyl aluminium, which has a concentration adjusted at 1 mol/L, as an organic aluminium compound (C). Next, 1 ml of a toluene solution of dimethylsilylenebis(3-phenylcyclopentadienyl) zirconium dichloride (racemic/meso ratio=49.2/50.8) (A), which has a concentration adjusted at 1 μmol/ml, was charged therein, and sequentially 15.8 mg of the solid catalyst component (B) obtained in the above Example 1-(1) was charged therein. While continuously feeding an ethylene/hydrogen mixed gas (hydrogen=0.05 mol %) during the polymerization, polymerization was carried out for 80 minutes at 70° C. Then, butane, ethylene and hydrogen were purged to obtain 192 g of an ethylene-1-hexene copolymer. Properties of the copolymer obtained are shown at Table 1.

Example 9

(1) Polymerization

After drying under reduced pressure, the inside of an autoclave with a stirrer having an inner volume of 3 L substituted with argon was made vacuum, hydrogen was added therein so as to give its partial pressure of 0.001 MPa, 60 ml of 1-hexene and 650 g of butane as a polymerization solvent were charged therein, and temperature was raised to 70° C. Thereafter, ethylene was added therein so as to give its partial pressure of 0.8 MPa and the inside of the system was made stable. As a result of gas chromatography analysis, the gas composition in the system indicated 0.06 mol % of hydrogen. Therein was charged 0.9 ml of a hexane solution of triisobutyl aluminium, which has a concentration adjusted at 1 mol/L, as an organic aluminium compound (C). Next, 1 ml of a toluene solution of dimethylsilylenebis(3-phenylcyclopentadienyl)zirconium dichloride (racemic/meso ratio=49.2/50.8) (A), which has a concentration adjusted at 1 μmol/ml, was charged therein, and sequentially 13 mg of the solid catalyst component (B) obtained in the above Example 1-(1) was charged therein.

While continuously feeding an ethylene/hydrogen mixed gas (hydrogen=0.05 mol %) during the polymerization, polymerization was carried out for 60 minutes at 70° C. Then, butane, ethylene and hydrogen were purged to obtain 37 g of an ethylene-1-hexene copolymer. Properties of the copolymer obtained are shown at Table 1.

Example 10

(1) Polymerization

After drying under reduced pressure, the inside of an autoclave with a stirrer having an inner volume of 3 L substituted with argon was made vacuum, hydrogen was added therein so as to give its partial pressure of 0.002 MPa, 55 g of 1-butene as a comonomer and 695 g of butane as a polymerization solvent were charged therein, and temperature was raised to 70° C. Thereafter, ethylene as a monomer was added therein so as to give its partial pressure of 1.6 MPa and the inside of the system was made stable. As a result of gas chromatography analysis, the gas composition in the system indicated 0.032 mol % of hydrogen and 2.74 mol % of 1-butene. Therein was charged 0.9 ml of a hexane solution of triisobutyl aluminium, which has a concentration adjusted at 1 mol/L, as an organic aluminium compound (C). Next, 0.75 ml of a toluene solution of dimethylsilylenebis(3-phenylcyclopentadienyl)zirconium dichloride (racemic/meso ratio=49.2/50.8), which has a concentration adjusted at 2 μmol/ml, was charged therein as a transition metal compound (A), and sequentially 15.2 mg of the solid catalyst component (B) obtained in the above Example 1-(1) was charged therein. While feeding ethylene gas so as to keep the total pressure constant, polymerization was carried out for 1 hour at 70° C. As the result thereof, 119 g of an olefin polymer was obtained. Properties of the copolymer obtained are shown at Table 1.

Example 11

(1) Polymerization

After drying under reduced pressure, the inside of an autoclave with a stirrer having an inner volume of 3 L substituted with argon was made vacuum, hydrogen was added therein so as to give its partial pressure of 0.002 MPa, 55 g of 1-butene as a comonomer and 695 g of butane as a polymerization solvent were charged therein, and temperature was raised to 70° C. Thereafter, ethylene as a monomer was added therein so as to give its partial pressure of 1.6 MPa and the inside of the system was made stable. As a result of gas chromatography analysis, the gas composition in the system indicated 0.096 mol % of hydrogen and 2.90 mol % of 1-butene. Therein was charged 0.9 ml of a hexane solution of triisobutyl aluminium, which has a concentration adjusted at 1 mol/L, as an organic aluminium compound (C). Next, 0.75 ml of a toluene solution of dimethylsilylenebis(3-phenylcyclopentadienyl)zirconium dichloride (racemic/meso ratio=49.2/50.8), which has a concentration adjusted at 2 μmol/ml, was charged therein as a transition metal compound (A). And sequentially, 0.9 ml of a toluene solution of triethylamine, which has a concentration adjusted at 0.1 mol/ml, was charged therein as an electron-donating compound (D), then 9.0 mg of the solid catalyst component (B) obtained in the above Example 1-(1) was charged therein. While feeding ethylene gas so as to keep the total pressure constant, polymerization was carried out for 1 hour at 70° C. As the result thereof, 40 g of an olefin polymer was obtained. Properties of the copolymer obtained are shown at Table 1.

Example 12

(1) Polymerization

After drying under reduced pressure, the inside of an autoclave with a stirrer having an inner volume of 3 L substituted with argon was made vacuum, hydrogen was added therein so as to give its partial pressure of 0.008 MPa, 30 g of 1-butene as a comonomer and 720 g of butane as a polymerization solvent were charged therein, and temperature was raised to 70° C. Thereafter, ethylene as a monomer was added therein so as to give its partial pressure of 1.6 MPa and the inside of the system was made stable. As a result of gas chromatography analysis, the gas composition in the system indicated 0.36 mol % of hydrogen and 1.60 mol % of 1-butene. Therein was charged 0.9 ml of a hexane solution of triisobutyl aluminium, which has a concentration adjusted at 1 mol/L, as an organic aluminium compound (C). Next, 0.75 ml of a toluene solution of dimethylsilylenebis(3-phenylcyclopentadienyl)zirconium dichloride (racemic/meso ratio=49.2/50.8), which has a concentration adjusted at 2 μmol/ml, was charged therein as a transition metal compound (A), and sequentially 17.1 mg of the solid catalyst component (B) obtained in the above Example 1-(1) was charged therein. While feeding ethylene gas so as to keep the total pressure constant, polymerization was carried out for 1 hour at 70° C. As the result thereof, 123 g of an olefin polymer was obtained. Properties of the copolymer obtained are shown at Table 1.

Comparative Example 1

(1) Preparation of Solid-State Catalyst Component

Into a reaction vessel substituted with nitrogen and equipped with a stirrer, 9.68 kg of silica (Sylopol 948 manufactured by Davison Co.) heat-treated at 300° C. under flow of nitrogen was charged as a particulate support. After 100 liters of toluene was charged thereinto, it was cooled to 2° C. 26.3 liter of a methylalumoxane in toluene solution (2.9 M) was added dropwise thereto over one hour. Stirring was conducted at 5° C. for 30 minutes, then temperature was raised to 95° C. over 90 minutes, and stirring was conducted for 4 hours. Then, after cooling the resultant mixture to 40° C., it was left at rest for 40 minutes to precipitate solid components and a slurry portion at upper layer was removed. As washing operations, 100 liters of toluene was added thereto, stirring was conducted for 10 minutes, and then stirring was stopped, it was left at rest to precipitate solid components and a slurry portion at upper layer was similarly removed. The above washing operations were repeated at three times in total. Additionally, 100 liters of toluene was added thereto, stirring was conducted, and a filtration was conducted simultaneously with stopping the stirring. After such an operation was repeated once more, 110 liters of hexane was added thereto and a filtration was conducted in the same manner. Such an operation was repeated once more. Then, 12.6 kg of a solid-state catalyst component was obtained by drying at 70° C. for 7 hours under flow of nitrogen. Elemental analysis result indicated Al=4.4 mmol/g.

(2) Preparation of Solid-State Polymerization Catalyst

Into a four-necked flask having an inner volume of 200 ml substituted with nitrogen and equipped with a stirrer, 7.7 g of the solid-state catalyst component obtained in Comparative Example 3 (1) as above and 50 ml of toluene were charged to form a slurry. Then, 38 ml of racemic-dimethylsilylenebis(2-methyl-1-indenyl)zirconium dichloride, which has a concentration adjusted at 5.3 μmol/ml, and 2.6 ml of meso-dimethylsilylenebis(2-methyl-1-indenyl)zirconium dichloride, which has a concentration adjusted at 2.5 μmol/ml, were charged therein (racemic/meso ratio=96.9/3.1) to conduct stirring at room temperature for one hour. Then, 7.8 g of a solid-state polymerization catalyst was obtained by drying at 50° C. for 9 hours under vacuum.

(3) Polymerization

After drying under reduced pressure, 32.6 of NaCl, which was dried/treated under reduced pressure at 140° C. for 6 hours, was added to an autoclave with a stirrer having an inner volume of 3 L substituted with argon, and the inside of the autoclave was made vacuum, hydrogen was added therein so as to give its partial pressure of 0.017 MPa, 6 g of 1-butene as a comonomer was charged therein, and temperature was raised to 70° C. Thereafter, ethylene as a monomer was added therein so as to give a pressure inside of the autoclave of 2.0 MPa and the inside of the system was made stable. As a result of gas chromatography analysis, the gas composition in the system indicated 0.80 mol % of hydrogen and 4.75 mol % of 1-butene. Therein was charged 0.3 ml of a hexane solution of triisobutyl aluminium, which has a concentration adjusted at 1 mol/L, as an organic aluminum compound (C). Next, 42.7 ml of the solid-state polymerization catalyst obtained in Comparative Example 3 (2) as above was added thereto. While continuously feeding an ethylene/hydrogen/1-butene mixed gas (hydrogen=0.50 mol % and 1-butene=5.0 mol %) so as to stably maintain a total pressure and hydrogen and 1-butene concentrations in a gas during the polymerization, polymerization was carried out for 2 hours at 70° C. As the result thereof, 56 g of an olefin polymer was obtained. Properties of the copolymer obtained are shown at Table 1.

Comparative Example 2

(1) Preparation of Modified Particles

Into a four-necked flask having an inner volume of 5 L substituted with nitrogen, 2 L of tetrahydrofuran and 1.35 L (2.7 mol) of hexane solution of diethyl zinc (2M) were charge to cool to −50° C. A solution, prepared by dissolving 251.5 g (1.37 mol) of pentafluorophenol in 390 ml of tetrahydrofuran, was added dropwise thereto over 25 minutes. After a completion of the addition, a temperature was gradually increased to room temperature to conduct stirring for 3 hours. Then, it was heated to 45° C. to conduct stirring for 1 hour. A temperature was decreased to 20° C. by an ice bath, and 37.72 g (2.09 mol) of $H_2O$ was added dropwise thereto over 1.4 hours. In result, it was separated into a yellow transparent liquid and a yellow gel. After the completion of the addition, stirring was conducted for 2 hours, temperature was increased to 40° C., and then stirring was further conducted for 1 hour. After leaving it at rest at room temperature overnight, 72 weight % of the yellow transparent liquid an a total amount of the yellow gel were taken into separate flasks, respectively, substituted with nitrogen. Respective volatile components were removed by distillation to dry at 120° C. for 8 hours under vacuum. Then, solid substances derived from the yellow transparent liquid were dissolved in 3 L of tetrahydrofuran, and the solution was transferred to 5 liter flask containing solid substances derived from the yellow gel. After leaving it at rest at room temperature for 69 hours, it was dried at 120° C. for 8 hours under vacuum. In result, 374 g of a solid product as obtained Into a four-necked flask having an inner volume of 5 L substituted with nitrogen, 374 g of the above solid product and 3 L of tetrahydrofuran were charge to conduct stirring. Thereinto, 282 g of silica (Sylopol 948 manufactured by Davison Co.; average particle diameter=61 μm; pore volume=1.61 ml/g; specific surface area=296 $m^2$/g) heat-treated at 300° C. under flow of nitrogen was charged. It was heated to 40° C., stirring was conducted for 2 hours, and then solid components were precipitated to remove a slurry portion at upper layer. As washing operations, 3 liters of tetrahydrofuran was added thereto, stirring was conducted, and then solid components were precipitated to remove a slurry portion at upper layer. The above washing operations were repeated at five times in total. After removing a liquid component by a glass filter, 452 g of modified particles was obtained by drying at 120° C. for 8 hours under vacuum.

(2) Polymerization

After drying under reduced pressure, the inside of an autoclave with a stirrer having an inner volume of 3 L substituted with argon was made vacuum, hydrogen was added therein so as to give its partial pressure of 0.001 MPa, 680 g of butane and 70 g of 1-hexene were charged therein, and temperature was raised to 70° C. Thereafter, ethylene was added therein so as to give its partial pressure of 1.6 MPa and the inside of the system was made stable. As a result of gas chromatography analysis, the gas composition in the system indicated 0.04 mol % of hydrogen and 3.21 mol % of 1-butene. Therein was charged 0.9 ml of a heptane solution of triisobutyl aluminium, which has a concentration adjusted at 1 mmol/ml, as an organic aluminium compound (C). Next, therein was charged 7.9 ml of a mixed toluene solution of three kinds of transition metal compounds which are racemic-ethylenebis(1-indenyl) hafnium dichloride having an adjusted content of 0.84 μmol/ml, racemic-ethylenebis(1-indenyl)zirconium dichloride having an adjusted content of 0.06 μmol/ml and bis(n-butyl-cyclopentadienyl)zirconium dichloride having an adjusted content of 0.25 μmol/ml. And sequentially 14.0 mg of the modified particles obtained in the above Comparative Example 4(1) was charged therein. While continuously feeding an ethylene/hydrogen mixed gas (hydrogen=0.09 mol %) so as to stably maintain a total pressure, polymerization was carried out for 60 minutes at 70° C. Then, 98 g of an ethylene-1-butene copolymer was obtained. Properties of the copolymer obtained are shown at Table 1.

Comparative Example 3

(1) Preparation of Solid-State Catalyst Component (S)

Into a reaction vessel substituted with nitrogen and equipped with a stirrer, 9.68 kg of silica (Sylopol 948 manufactured by Davison Co.) heat-treated at 300° C. under flow of nitrogen was charged as a particulate support component (b4). After 100 liters of toluene was charged thereinto, it was cooled to 2° C. 26.3 liter of a methylalumoxane in toluene solution (2.9 M) was added dropwise thereto over one hour. Stirring was conducted at 5° C. for 30 minutes, then temperature was raised to 95° C. over 90 minutes, and stirring was conducted for 4 hours. Then, after cooling the resultant mixture to 40° C., it was left at rest for 40 minutes to precipitate solid components and a slurry portion at upper layer was removed. As washing operations, 100 liters of toluene was added thereto, stirring was conducted for 10 minutes, and then stirring was stopped, it was left at rest to precipitate solid components and a slurry portion at upper layer was similarly removed. The above washing operations were repeated at three times in total. Additionally, 100 liters of toluene was added thereto, stirring was conducted, and a filtration was conducted simultaneously with stopping the stirring. After such an operation was repeated once more, 110 liters of hexane was added thereto and a filtration was conducted in the same manner. Such an operation was repeated once more. Then, 12.6 kg of a solid-state catalyst component was obtained by drying at 70° C. for 7 hours under flow of nitrogen. Elemental analysis result indicated Al=4.4 mmol/g.

(2) Preparation of Catalyst Component Slurry (Cat-1)

Into a glass having an inner volume of 100 ml substituted with nitrogen, 12.5 ml of toluene solution of dimethylsilanediyl-bis(cyclopentadienyl)zirconium dichloride having an adjusted content of 2 μmol/ml [corresponding to transition metal compound (A1)] and 1 ml of toluene solution of diphenylmethylene(1-cyclopentadienyl)(9-fluorenyl)zirconium dichloride having an adjusted content of 2 μmol/ml [corresponding to transition metal compound (A2)] were charged. Then, 200 mg of the solid-state catalyst component (S) prepared at the above (1) was added thereto, to conduct a reaction at room temperature for 5 minutes. Then, supernatant liquid was removed by decantation to wash it with hexane twice to form 6 ml of hexane slurry.

(3) Polymerization

After drying under reduced pressure, the inside of an autoclave with a stirrer having an inner volume of 3 L substituted with argon was made vacuum, 180 ml of 1-hexene and 650 g of butane as a polymerization solvent were charged therein and temperature was raised to 70° C. Then, an ethylene/hydrogen mixed gas (hydrogen=0.33 mol %) was added therein so as to give a mixed gas partial pressure of 1.6 MPa, and the inside of the system was made stable. As a result of gas chromatography analysis, the gas composition in the system indicated 0.15 mol % of hydrogen. Therein was charged 0.9 ml of a hexane solution of triisobutyl aluminium, which has a concentration adjusted at 1 mol/L, as an organic aluminium compound (C). Next, 6 ml of the catalyst component slurry (Cat-1) obtained in the above (2) was charged therein. While continuously feeding an ethylene/hydrogen mixed gas (hydrogen=0.33 mol %) during the polymerization, polymerization was carried out for 60 minutes at 70° C. Then, butane, ethylene and hydrogen were purged to obtain 71 g of an ethylene-1-hexene copolymer. Properties of the copolymer obtained are shown at Table 1.

Comparative Example 4

1) Into a four-necked flask having an inner volume of 50 ml substituted with nitrogen gas, 42 mg of racemic ethylenebis(1-indenyl)zirconium dichloride EIZC was charged. Then, 6.0 ml of toluene solution (2.72 mmol/ml) of PMAO was added thereto, 9 ml of toluene was further added, and it was heated to 65° C. with stirring. When it was heated to a temperature of 65° C., 2.10 g of dried silica, which was pre-dried at 800° C. under nitrogen, was added thereto to continue stirring for 1 hour. Then, toluene was vacuum-removed to obtain 2.43 g of dry powders (S2).

(2) Polymerization

After drying under reduced pressure, 27.3 of NaCl, which was dried/treated under reduced pressure at 140° C. for 6 hours, was added to an autoclave with a stirrer having an inner volume of 3 L substituted with argon, and the inside of the autoclave was made vacuum, 6 g of 1-butene as a comonomer was charged therein, and temperature was raised to 75° C. Thereafter, ethylene as a monomer was added therein so as to give a pressure inside of the autoclave of 0.8 MPa and the inside of the system was made stable. As a result of gas chromatography analysis, the gas composition in the system indicated 10.3 mol % of 1-butene. Therein was charged 0.3 ml of a hexane solution of triisobutyl aluminium, which has a concentration adjusted at 1 mol/L, as an organic aluminum compound (C). Next, 110.9 ml of the dry powders (S2) obtained in Comparative Example 4 (1) as above was added thereto. While continuously feeding an ethylene/1-butene mixed gas (1-butene =3.8 mol %) so as to stably maintain a total pressure and 1-butene concentration in a gas during the polymerization, polymerization was carried out for 2 hours at 75° C. As the result thereof, 39 g of an olefin polymer was obtained. Properties of the copolymer obtained are shown at Table 1.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Density | kg/m$^3$ | 922 | 921 | 923 | 923 | 922 | 926 | 925 | 920 | 918 | 921 |
| MFR | g/10 min. | 0.34 | 0.90 | 1.87 | 3.38 | 3.65 | 13.10 | 19.60 | 2.14 | 0.44 | 0.41 |
| MFRR | — | 190 | 74 | 55 | 46 | 46 | 37 | 35 | 55 | 73 | 90 |
| SR | — | 1.83 | 1.88 | 1.80 | 1.81 | 1.80 | 1.77 | 1.65 | 1.78 | 1.76 | 1.64 |
| N$_{SCB}$ | 1/1000 C | 17.42 | 16.38 | 15.80 | 15.70 | 16.06 | 16.06 | 16.21 | 17.36 | 18.57 | 16.05 |
| N$_{LCB}$ | 1/1000 C | 0.46 | 0.34 | 0.36 | 0.35 | 0.34 | 0.29 | 0.23 | 0.29 | 0.36 | 0.49 |
| Molecular Weight Distribution Mw/Mn | — | 5.3 | 6.3 | 6.5 | 6.3 | 5.4 | 5.9 | 5.4 | 5.2 | 5.9 | 6.2 |
| Ea | KJ/mol | 76 | 67 | 63 | 57 | 59 | 55 | 55 | 62 | 71 | 56 |
| τ | | 7.8 | 4.4 | 2.4 | 1.3 | 1.2 | 0.3 | 0.2 | 2.0 | 7.5 | 7.1 |
| g* | — | 0.61 | 0.70 | 0.70 | 0.72 | 0.73 | 0.75 | 0.74 | 0.73 | 0.70 | 0.66 |
| k | — | —* | 0.86 | 1.17 | 0.99 | 1.11 | 0.97 | 1.16 | —* | —* | —* |
| MT | cN | 30.3 | 20.9 | 8.0 | 4.6 | 4.0 | 1.0 | 0.6 | 7.0 | 25.6 | —* |
| CXS | % | —* | 1.2 | 1.2 | 1.2 | 1.3 | 1.3 | 1.5 | 1.4 | 1.4 | —* |
| Number of DSC peaks | — | 2 | 2 | 2 | 2 | 2 | 2 | 2 | 2 | 2 | —* |

| | | Example 11 | Example 12 | Comparative Example 1 | Comparative Example 2 | Comparative Example 3 | Comparative Example 4 |
|---|---|---|---|---|---|---|---|
| Density | kg/m$^3$ | —* | —* | 918 | —* | 920 | 916 |
| MFR | g/10 min. | 3.20 | 7.60 | 2.15 | 1.09 | 2.96 | 0.76 |
| MFRR | — | 50 | —* | 50 | 43 | 109 | 42 |

TABLE 1-continued

| | | | | | | | |
|---|---|---|---|---|---|---|---|
| SR | — | 2.03 | —* | 1.75 | 2.12 | 2.48 | 1.60 |
| $N_{SCB}$ | 1/1000 C | 16.33 | 13.24 | 25.51 | 13.90 | 21.7 | 30.3 |
| $N_{LCB}$ | 1/1000 C | 0.46 | 0.31 | 0 | —* | 0 | 0.14 |
| Molecular Weight Distribution Mw/Mn | — | 10.3 | 7.2 | 6.4 | 4.5 | 11.0 | 4.8 |
| Ea | KJ/mol | 67 | 60 | 66 | 65 | 48 | 74 |
| τ | | 1.9 | 0.5 | 6.2 | 31.8 | 15.6 | 11.8 |
| g* | — | 0.64 | 0.67 | 0.93 | 0.854 | 0.895 | 0.76 |
| k | — | —* | —* | 0.67 | —* | 1.27 | 0.73 |
| MT | cN | —* | —* | 5.5 | —* | 15.4 | 13.2 |
| CXS | % | —* | —* | 2.7 | —* | 12.2 | 22.0 |
| Number of DSC peaks | — | —* | —* | 1 | —* | 2 | 2 |

—* unmeasured

The invention claimed is:

1. An ethylene-α-olefin copolymer having a monomer unit based on ethylene and a monomer unit based on an α-olefin having 3 to 20 carbon atoms, which has a melt flow rate (MFR) of 0.1 to 100 g/10 min, a density (d) of 850 to 940 kg/m$^3$, a ratio (Mw/Mn) of weight average molecular weight (Mw) to number average molecular weight (Mn) of 2 to 12, and a value g* defined by the following formula (I) of 0.50 to 0.75:

$$g^* = [\eta]/([\eta]_{GPC} \times g_{SCB}^*) \quad (I),$$

wherein [η] stands for intrinsic viscosity (unit: dl/g) of the ethylene-α-olefin copolymer and is defined by the following formula (I-I):

$$[\eta] = 23.3 \times \log(\eta \text{rel}) \quad (I\text{-}I),$$

wherein ηrel stands for relative viscosity of the ethylene-α-olefin copolymer, $[\eta]_{GPC}$ is defined by the following formula (I-II):

$$[\eta]_{GPC} = 0.00046 \times Mv^{0.725} \quad (I\text{-}II),$$

wherein Mv stands for viscosity average molecular weight of the ethylene-α-olefin copolymer, and $g_{SCB}^*$ is defined by the following formula (I-III):

$$g_{SCB}^* = (1-A)^{1.725} \quad (I\text{-}III),$$

wherein A can be obtained directly by measuring short chain branch content in the ethylene-α-olefin copolymer.

2. The ethylene-α-olefin copolymer according to claim 1, which has a swell ratio (SR) of not less than 1.55.

3. The ethylene-α-olefin copolymer according to claim 1, which has a melt flow rate ratio (MFRR) of not less than 30.

4. A molded object produced by extrusion molding of the ethylene-α-olefin copolymer according to any one of claim 1.

* * * * *